United States Patent
Burger et al.

(10) Patent No.: US 6,353,660 B1
(45) Date of Patent: Mar. 5, 2002

(54) VOICE CALL PROCESSING METHODS

(75) Inventors: Eric William Burger, McLean, VA (US); John Kimball, Gaithersburg, MD (US)

(73) Assignee: SS8 Networks, Inc., San Jose, CA (US)

( * ) Notice: Subject to any disclaimer, the term of this patent is extended or adjusted under 35 U.S.C. 154(b) by 0 days.

(21) Appl. No.: 09/517,304

(22) Filed: Mar. 2, 2000

(51) Int. Cl.$^7$ .............................................. H04M 3/436

(52) U.S. Cl. ............................... 379/88.17; 379/90.01; 379/201.11; 370/352

(58) Field of Search .............................. 379/67.1, 88.17, 379/88.22, 88.25, 90.01, 93.01, 93.24, 201.01, 201.11, 210.03, 211.01, 211.02, 212.01, 214.01; 370/912, 352, 353, 354, 355, 356; 709/227

(56) References Cited

U.S. PATENT DOCUMENTS

| | | | |
|---|---|---|---|
| 4,847,890 A | | 7/1989 | Solomon et al. |
| 4,878,239 A | | 10/1989 | Solomon et al. |
| 5,058,152 A | | 10/1991 | Solomon et al. |
| 5,327,486 A | * | 7/1994 | Wolff et al. ............... 379/93.23 |
| 5,361,295 A | | 11/1994 | Solomon et al. |
| 5,581,553 A | | 12/1996 | Cave et al. |
| 5,604,792 A | | 2/1997 | Solomon et al. |
| 5,623,536 A | | 4/1997 | Solomon et al. |
| 5,796,806 A | | 8/1998 | Birckbichler |
| 5,805,587 A | * | 9/1998 | Norris et al. ................ 370/352 |
| 5,809,128 A | | 9/1998 | McMullin |
| 5,818,836 A | * | 10/1998 | DuVal ......................... 370/389 |
| 5,907,677 A | * | 5/1999 | Glenn ......................... 709/206 |
| 6,088,435 A | * | 7/2000 | Barber et al. .......... 379/205.01 |
| 6,144,644 A | * | 11/2000 | Bajzath et al. ............... 370/259 |
| 6,259,692 B1 | * | 7/2001 | Shtivelman et al. ........ 370/352 |
| 2001/0026609 A1 | * | 10/2001 | Weinstein et al. ........ 379/93.01 |

OTHER PUBLICATIONS

8x8, Inc. (Feb. 15, 2000), "*IP Telephony: Audacity–T2 IP Phone Processor,*" 1–3. Available Web Site: www/8x8.com/iptelephony/audacityT2.html.

(List continued on next page.)

*Primary Examiner*—Scott L. Weaver
(74) *Attorney, Agent, or Firm*—Pennie & Edmonds LLP

(57) ABSTRACT

A call screening method allows a subscriber to screen calls made to the subscriber from callers using the PSTN while the subscriber uses another communications medium. An enhanced services platform (ESP) receives a first call from a caller using a particular public telephone number for the particular subscriber. The ESP identifies the particular public telephone number for the particular subscriber. The ESP accesses a database storing a public telephone number and a private packet-based address for subscribers to retrieve a private packet-based address of the particular subscriber on the basis of the particular public telephone number. An introductory message is provided to the caller and prompts the caller to leave a message. The ESP accesses the particular subscriber based on the particular subscriber private packet-based address to establish an audio connection via the communication medium. The subscriber is notified of the first call. If the subscriber answers the call, a communication path is provided between the caller and the subscriber via the communication medium so that the subscriber may hear the caller leave the message but the caller does not hear or know that the particular subscriber is listening. The ESP connects the caller and the subscriber for two-way communication upon the authorization of the subscriber. In another embodiment, both the caller and the subscriber use a packet-based network. In another aspect of the invention, the ESP records the caller's voice in response to the prompt, and plays the recording to the subscriber if the subscriber answers the call. In yet another aspect of the invention, the ESP provides a method for anonymously connecting an accesser to a subscriber using a packet-based network.

64 Claims, 16 Drawing Sheets

OTHER PUBLICATIONS

Siemens (Feb. 15, 2000), "HiNet LP 5100: LAN–Telephon," 1–2. Available Web Site: www/siemens.de/ic/db4web_c/productdb/user/list/.d4w?Nr=375.

Siemens AG (1999), "IP Communication HiNet: HiNet LP 5100 IP Telephone," 4 pgs.

AT&T Chat 'N Talk: Home Page, "AT&T Inter@ctive Communications Trial," 1 page, Last modified on Dec. 1, 1998.

AT&T Chat 'N Talk: What Is It?, "AT&T Inter@ctive Communictions Trial: What Is It?," 1 page, Last modified on Dec. 1, 1998.

AT&T Chat 'N Talk: Pricing, "AT&T Inter@ctive Communictions Trial: What Does It Cost?," 1 page, Last modified on Oct. 29, 1998.

AT&T Chat 'N Talk: What Do I Need?, "AT&T Inter@ctive Communictions Trial: What Do I Need?," 1–2, Last modified on Dec. 1, 1998.

AT&T Chat 'N Talk: How Do I Use It?, "AT&T Inter@ctive Communictions Trial: How Do I Use It?," 1–2, Last modified on Dec. 1, 1998.

AT&T Chat 'Talk: Help Overview?, "AT&T Inter@ctive Communictions Trial: Help," 1 page, Last modified on Jul. 7, 1998.

AT&T Chat 'N Talk: FAQs?, "AT&T Inter@ctive Communictions Trial: Frequently Asked Questions?," 1–3, Last modified on Dec. 1, 1998.

AT&T Chat 'N Talk: Cool Sites, "AT&T Inter@ctive Communictions Trial: Cool Sites," 1–3, Last modified on Jun. 5, 1998.

Vocal Telephony Gateway—Intro, "The VocalTec Telephony Gateway." 1–1, Accessed on Dec. 17, 1998.

Vocal Telephony Gateway—What Is The Voca . . . , "What is it?" 1–2, Accessed on Dec. 17, 1998.

Vocal Telephony Gateway—Series, "30/120/480 Series." 1–2, Accessed on Dec. 17, 1998.

Vocal Telephony Gateway—Applications, "Solutions and Applications." 1–2, Accessed on Dec. 17, 1998.

Vocal Telephony Gateway—Requirements, "Hardware Requirements," Accessed on Dec. 17, 1998.

The Electric Magic Company: Home Page, Accessed on Dec. 17, 1998, 1–2.

Cisco Systems, Inc., "Cisco AS5300 Voice Gateway," 1–7, Posted Jul. 1, 1998.

Cisco Systems, Inc., "The VoIP Multiservice ATM Architecture," 1–6, Posted Apr. 27, 1998.

Cisco Systems, Inc., "AS5300 Series Access Servers," 1–2, Accessed on Oct. 25, 1998.

Dialogic—Standards, "IP Standards," 1–4, Accessed on Oct. 25, 1998.

Wincroft Inc. (1998), "Internet Telephony Software Product Range fro . . . : Products," 1 page, Accessed on Dec. 17, 1998.

Advanstar Communications (Jun. 15, 1998), "America's Network: Real–world VOIP," 1–5, Accessed on Oct. 25, 1998.

Advanstar Communications (Jun. 15, 1998), "America's Network: Real–world VOIP; Figure 1—Deep Fiber Solutions," 1 page, Accessed on Oct. 25, 1998.

Advanstar Communications (Jun. 15, 1998), "America's Network: Real–world VOIP; Figure 2—Deep Fiber Solutions," 1 page, Accessed on Oct. 25, 1998.

Cisco Systems, Inc. (1992), "Cisco AS5200/AS5300 Family Universal Access S . . . : Cisco AS5200/AS5300 Family Universal Access Servers," 1–10, Accessed on Oct. 25, 1998.

Cisco Systems, Inc. (1998), "Voice/Fax Feature Card for the Cisco AS5300," 1–10, Accessed on Oct. 25, 1998.

Mecklermedia Corporation (1998), "H.323—PC Webopaedia Definition and Links: Still looking for a new job?," 1–2, Accessed on Nov. 2, 1998.

pulver.com, Inc. (1998), "The Pulver Points: Pulver Points(™) on the Internet Telephony Industry," (Sep. 1, 1998—Version 1.21), 1–2, Accessed on Nov. 2, 1998.

DataBeam Corporation, "A Primer on the H.323 Series Standard: A Primer on the H.323 Series Standard," Version 2.0, 1–20, Accessed on Nov. 2, 1998.

DataBeam Corporation, Available Web Site:http://gw.databeam.com/h323/images/fig1_large . . . 1–1, Accessed on Nov. 2, 1998.

DataBeam Corporation, Available Web Site: http://gw.databeam.com/h323/images/fig2_large . . . 1–1, Accessed on Nov. 2, 1998.

DataBeam Corporation, Available Web Site: http://gw.databeam.com/h323/images/fig3_large . . . 1–1, Accessed on Nov. 2, 1998.

DataBeam Corporation, Available Web Site: http://gw.databeam.com/h323/images/fig4_large . . . 1–1, Accessed on Nov. 2, 1998.

DataBeam Corporation, Available Web Site: http://gw.databeam.com/h323/images/fig5_large . . . 1–1, Accessed on Nov. 2, 1998.

DataBeam Corporation, Available Web Site: http://gw.databeam.com/h323/images/fig6_large . . . 1–1, Accessed on Nov. 2, 1998.

DataBeam Corporation, H.323 Product Information, "H.323 Version 2—Overview," 1–6, Accessed on Nov. 2, 1998.

Inside IMTC, "H.323 ITU Standards," 1–3, Accessed on Nov. 2, 1998.

* cited by examiner

URL protocol://hostname:port/path_to_resource protocol://username:password@hostname:port/path_to_resource

US 6,353,660 B1

VOICE CALL PROCESSING METHODS

The present invention relates generally to voice call processing methods, and particularly to a method and apparatus for voice call screening and anonymous calling using packet-based transport.

BACKGROUND OF THE INVENTION

The Internet is a wide area network that connects thousands of disparate networks in industry, education, government, and research. In the internet, a collection of packet-switching networks are physically interconnected by gateways that use internet protocol (IP). The internet protocol is used to route data from its source to its destination. In particular, the Internet uses transport control protocol/internet protocol (TCP/IP) as the standard for transmitting information. In the TCP/IP protocol, a numbering system of internet addresses, called IP addresses, is used to specify a particular network or a particular host on that network with which to communicate.

Traditionally, the Public Switched Telephone network (PSTN) provides voice communications services using circuit switching. Recently, the Internet and other packet-based networks have been used to provide voice services using packet switching and Voice over Internet Protocol (VoIP).

Packet-based interfaces use network bandwidth more efficiently than circuit switched interfaces. Some long distance carriers already have an infrastructure that uses packet-based transport to provide voice services. However, even when a caller places a call to a packet-based long distance carrier, the call is switched through a circuit switch via the local exchange carrier to interface with the long distance carrier. The long distance carrier converts the circuit switched voice signals to packets for transport over the packet-based network and converts the packets back to analog voice signals for delivery to the called party's local exchange carrier.

Call screening has long been provided in circuit switched networks such as the Public switched telephone network. However, because of the trend to packet-based systems that use VoIP protocol, there is a need for efficient call screening using packet-based systems.

Anonymous calling has also been provided in circuit switched networks. Because of the trend to packet-based systems that use VoIP protocol, there is also a need for efficient anonymous calling using packet-based systems.

SUMMARY OF THE INVENTION

A call screening method allows a subscriber to screen calls made to the subscriber from callers using the PSTN while the subscriber uses another communications medium. An enhanced services platform (ESP) receives a first call from a caller using a particular public telephone number for the particular subscriber. The ESP identifies the particular public telephone number for the particular subscriber and accesses a database storing a public telephone number and a private packet-based address for each subscriber. The ESP retrieves a private packet-based address of the particular subscriber on the basis of the particular public telephone number. An introductory message is provided to the caller and prompts the caller to leave a message. The ESP accesses the subscriber based on the private packet-based address to establish an audio connection via the communication medium. The subscriber is notified of the first call. If the subscriber answers the call, a communication path is provided between the caller and the subscriber via the communication medium so that the subscriber may hear the caller leave the message but the caller does not hear or know that the subscriber is listening. The ESP connects the caller and the subscriber for two-way communication upon the authorization of the subscriber.

In one aspect of the invention the communication medium is a packet network. In a aspect of the invention, the packet network is an internet.

In another aspect of the invention, if the subscriber does not answer the first call, the message is recorded for later playback to the subscriber.

In yet another aspect of the invention, the database stores the public telephone number, the private packet-based address and a private telephone number for each subscriber. If the subscriber cannot be accessed via the communication medium, the private telephone number is retrieved on the basis of the public telephone number. A second call is placed to the particular subscriber using the particular private telephone number via the PSTN. If the particular subscriber picks up the second call, a communication path is provided between the caller and the subscriber so that the subscriber may hear the caller leave the message but the caller does not hear or know that the subscriber is listening.

In another aspect of the invention, a call screening method allows a subscriber to screen calls, when both the subscriber and the caller use packet-based media to communicate.

In an alternate embodiment, a call screening method records the caller's voice which is subsequently played to the subscriber so that the subscriber may authorize the call.

Yet another aspect of the invention provides anonymous calling using a packet-based network. The ESP establishes a call connection between an accesser and a subscriber using the packet based network. The method allows the accesser to communicate with the subscriber without the accesser knowing the identity of the subscriber prior to establishing communication with the subscriber. In an alternate embodiment, the call connection between the accesser and the subscriber is made using the PSTN.

DESCRIPTION OF THE PREFERRED EMBODIMENTS

Figure 1:
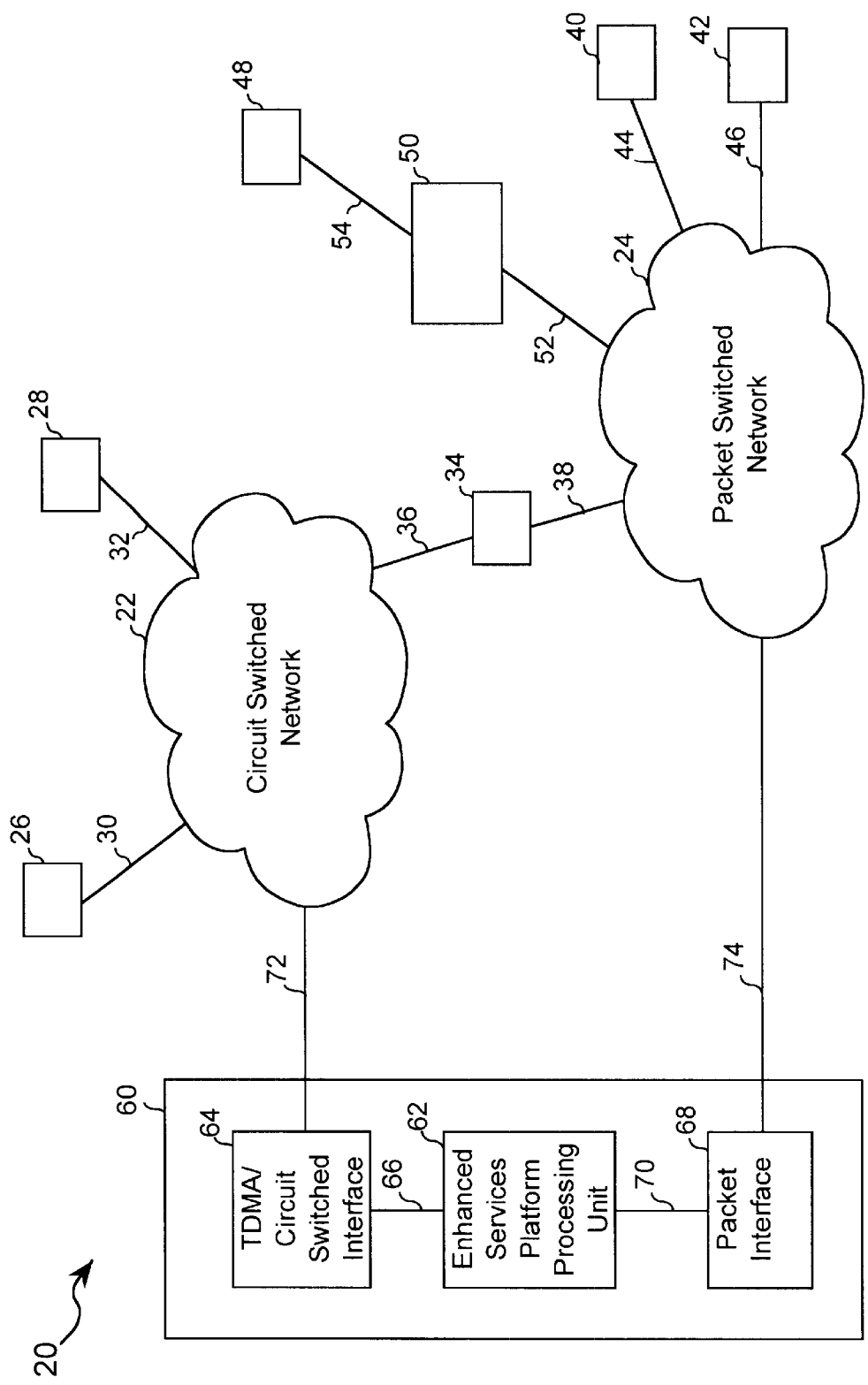
FIG. 1 is a block diagram of a network including an enhanced services platform that embodies the call screening method of the present invention.

In FIG. 1, a complex network 20 includes a circuit switched network 22 and a packet-switched network 24. The circuit switched network 22 connects to communications devices 26, 28 such as telephones, cellular telephones, computers and other terminal devices. Communication media 30, 32 connect the communications devices 26, 28, respectively, to the circuit switched network 22. The circuit switched network 22 is the PSTN. In an alternate embodiment, the circuit switched network 22 includes a switch, such as a private branch exchange (PBX).

A gateway 34 connects the packet-switched network 24 to the circuit switched network 22. The gateway 34 translates protocols and interfaces with lower level connections between the packet switched network 24 and the circuit switched network 22. In one implementation, the gateway 34 is a Cisco AS5300 Voice Gateway. Communication media 36 and 38 connect the gateway 34 to the circuit switched network 22 and packet switched network 24, respectively. The packet switched network 24 is a global network of switches, routers, hubs and links. Alternately, the packet switched network 24 may be a simple ethernet hub.

The packet switched network connects to packet-based terminal devices 40, 42 via communication media 44, 46. The packet-based terminal devices 40, 42 include a packet-based telephone such as the Internet Phone manufactured by VocalTec, Inc., PBX's, local area networks, computers, personal computers, personal digital assistants and the like. The packet switched network 24 can also connect to circuit switched devices 48 via another gateway 50. Communication media 52 and 54 connect the packet switched network 24 to the gateway 50 and circuit switched device 48, respectively.

In the complex network 20, an enhanced services platform (ESP) 60 of the present invention implements novel methods for voice call screening. In the ESP 60, an ESP processing unit 62 connects to a circuit switched interface 64 and to a packet interface 68 via a system bus 66. In one embodiment, the circuit switched interface 64 is a Natural Microsystems AG-T1 interface, the bus 66 is an H.110 or H-MVIP bus, and the packet interface 60 is a Natural Microsystems Fusion interface card. Communication media 72 and 74 connect the circuit switched network 22 and packet switched network 24 to the circuit switched interface 64 and packet interface 68, respectively.

The communication media 30, 32, 36, 38, 44, 46, 52, 54, 72 and 74 may be implemented using any media of appropriate bandwidth such as copper wire, optical fiber and radio. Preferably the communication medium 72 is a T1 line. Alternately, the communication medium 72 is ISDN PRI or a T3 line.

In an alternate embodiment, the packet interface 68 is external to the ESP 60. For example, the external packet interface 68 can be a CISCO AS5300 Voice Gateway, connecting to the ESP processing unit 62.

Figure 2:
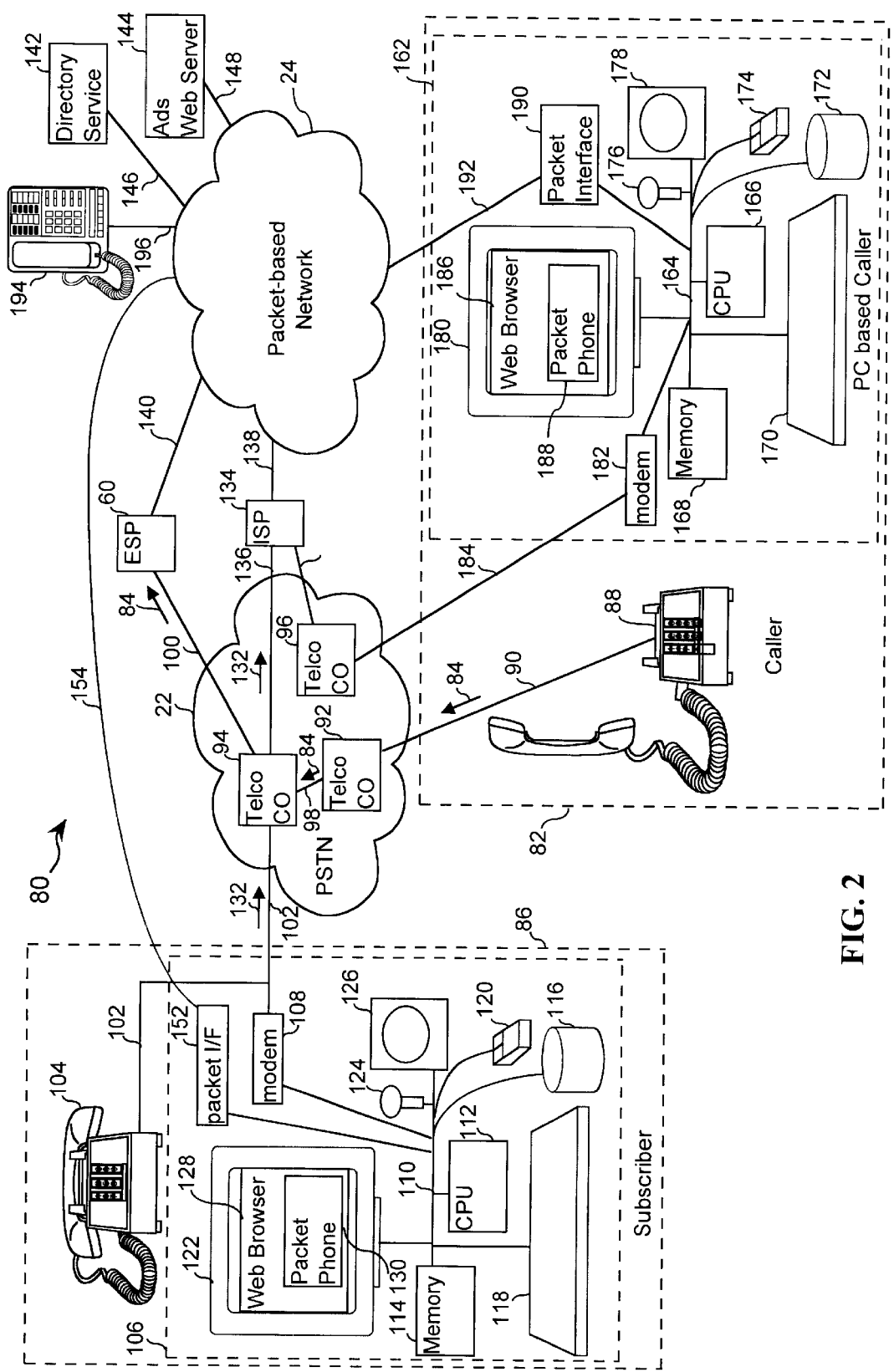
FIG. 2 is a diagram illustrating communication paths between a particular caller to a particular subscriber in the network using the enhanced services platform of FIG. 1 in the following contexts: PSTN-to-internet, internet-to-PSTN and internet-to-internet.

More particularly, in an exemplary network configuration 80 shown in FIG. 2, a caller 82 places a call 84 to a subscriber 86 using a public telephone number that terminates at the ESP 60. In one embodiment, the caller 82 uses a telephone 88 that is connected via communication medium 90 to the circuit switched network 22 to transport the call 84. In this embodiment, the circuit switched network 22 is the PSTN that includes central office switches (Telco CO) 92, 94 and 96. The interconnection 98 between central office switches 92 and 94 can be formed in many ways and is part of the context in which the invention operates.

The ESP 60 is connected to the circuit switched network 22 via interconnection 100. In one embodiment, interconnection 100 has a set of DID lines from the Central office switch 94 to the ESP 60. Each DID line connects to a specific port of the circuit switched interface 64 (See FIG. 1) of the ESP 60. Preferably, the interconnection 100 is a T1 line that carries the DID lines.

The subscriber 86 is also connected to the circuit switched network 22 via a communication medium 102. In particular, the subscriber 86 has a telephone 104 and a computer 106 connected to the communication medium 102. Either internal or external to the subscriber's computer 106, a modem 108 connects to the communication medium 102. In the subscriber's computer 106, at least one system bus 110 interconnects a processor 112, a memory 114, a disk drive 116, a keyboard 118, a mouse 120, a display 122, a microphone 124, a speaker 126 and the modem 108. The subscriber's computer 106 executes a web browser 128 and packet phone procedure 130. Some exemplary web browsers 128 include Microsoft Internet Explorer and Netscape Navigator. An exemplary packet phone procedure 130 is Internet Phone, manufactured by VocalTec, Inc.

To access the packet-based network 24 such as the internet, the subscriber's computer 106 places a call 132 via the modem 108 and the circuit switched network to their internet service provider (ISP) 134. In this way, a communications path is formed via the communications medium 102, the circuit switched network 22 and another communications medium 136 to the ISP 134. The ISP 134 connects to the packet-based network 24 via interconnection 138. Packet-based networks are well-known and are part of the context in which the invention operates. The packet-based network may be implemented in any manner and may include the use of DS-3 and/or asynchronous transfer mode (ATM) communications.

The ESP 60 also connects to the packet-based network 24 via an interconnection 140. The packet network 24 connects to at least one directory service 142 and an advertising server 144 via interconnections 146 and 148, respectively. The directory service 142 and advertising server 144 are exemplary sources of public packet network addresses which are used to contact subscribers.

In an alternate embodiment, the subscriber's computer 106 has a packet interface 152, such as an ethernet or fiber data distributed interface (FDDI), to connect to the packet-based network 24 via communication medium 154. Alternately, using the packet interface 152, the subscriber's computer 106 connects to a local area network that is part of the packet-based network 24.

In another embodiment, the caller 82 also has a computer 162. At least one system bus 164 interconnects a processor 166, a memory 168, a keyboard 170, a disk 172, a mouse 174, a microphone 176, a speaker 178, a display 180 and a modem 182. The modem 182 connects to the circuit-switched network 22 via interconnection 184. A web browser 186 and a packet phone procedure 188 are executed on the caller's computer 182.

In another alternate embodiment, the caller's computer 162 has a packet interface 190, such as an ethernet or fiber data distributed interface (FDDI), to connect to the packet-based network 24 via communication medium 192. Alternately, using the packet interface 190, the caller's computer 162 connects to a local area network that is part of the packet-based network 24.

In yet another embodiment, an IP phone 194 connects to the packet-based network 24 via interconnection 196. The IP phone 194 may include an Audacity-T2 IP Phone processor. Alternately, the IP phone may be a HiNet™ (Registered Trademark of Siemens AG) LP 5100 IP Telephone manufactured by Siemens AG. Either the cller or the subscriber may use the IP phone to communicate over the packet-based network.

Before explaining the details of the call screening method of the present invention, the following terms will be defined.

An IP address is a unique identifier that specifies a particular host on the internet, such as 123.45.67.89.

A host is any computer system that has at least one associated IP address. A host with multiple network interfaces may be associated with multiple IP addresses. In addition, in a multi-homing arrangement, a single network interface on a host may have multiple IP addresses.

A server is a computer system, connected to the network, that handles the requests from a computer system at another site. A server is also a host. A particular host may have several servers.

A domain name is a unique name or address for a publisher on the Internet and can be matched to an IP address. Many domain names can be mapped to the same IP address.

A domain name system maps a domain name to an IP address.

A domain name server is a program that runs on the domain name system that translates a domain name to an IP address.

A uniform resource locator (URL) is a string of ASCII characters that is used to identify resources that are available using Internet protocols.

Figures 3A, 3B:
FIG. 3A illustrates a general format for a universal resource locator (URL).
FIG. 3B illustrates another format for a universal resource locator that is used to specify a username, password and port.

As shown in FIG. 3A, URLs have a standard naming convention that names the protocol the client will use to access and transfer the file. Following the colon and double slashes, the "Hostname" information identifies the address to a host and is broken down into two or more parts separated by periods. One of the parts specifies a domain. Some well-known domains include: "com" for commercial sites, "edu" for education sites, "gov" for nonmilitary government sites, "mil" for military sites, "net" for network sites, such as developers and internet service providers (ISPs), and "org" for organizational sites. The periods are used to separate domain information from the hostname. For example, the URL, www.centigram.com, identifies a web server called www in centigram.com which is in the commercial domain.

After the hostname field, an optional field may be used to define a port. In a server, certain ports are allocated for certain functions. For instance, port 80 is used for incoming requests for hypertext documents. The server listens on a particular port for incoming requests. Port information in a URL identifies the port number to be used for the connection. If no port number is specified, a default value is used. Typically, port numbers are not specified.

The last part of a URL is the path to the resource which generally follows the directory structure from the root directory to the resource specified in the URL. Both absolute and relative paths to the resource can be specified. A completely specified path to a resource is called an absolute path. A relative path is used to locate a file in relation to a current directory.

FIG. 3B is similar to FIG. 3A except that a username and password are also specified to enable users to log in to a system automatically.

As used in this description, a packet network address includes both URLs and IP addresses. After translation, the URL includes an IP address.

Referring back to FIG. 2, the ESP 60 will have an ESP IP address and an ESP URL. The ISP 134 will also have an ISP IP address and an ISP URL. The ESP 60 and the ISP 134 will look like web servers to the packet-based network. When a caller 82 or a subscriber 86 accesses their ISP 134, the ISP 134 assigns a temporary IP address to the caller 82 or the subscriber 86, respectively. The ISP maintains a mapping from the subscriber's permanent URL (e.g., the hostname) to the temporary IP address. One method for IP address assignment is Dynamic Host Configuration Protocol (DHCP), Reference RFC 1531 developed by the Internet Engineering Task Force (IETF).

The ESP 60 associates the temporary IP address of the subscriber with a public telephone number for the subscriber. In one embodiment, the temporary IP address has a predetermined format for each subscriber. In an alternate embodiment, the ESP 60 queries the ISP 134 for the temporary IP address of the subscriber when a call is received using, for example, Active Directory from Microsoft Corporation. Alternatively, the subscriber registers their presence with a presence client. A presence client registers the subscriber's IP address and port number so that the ESP 60 can store a subscriber IP address and port tuple.

The Caller Calls a Public Telephone Number

Figure 4:
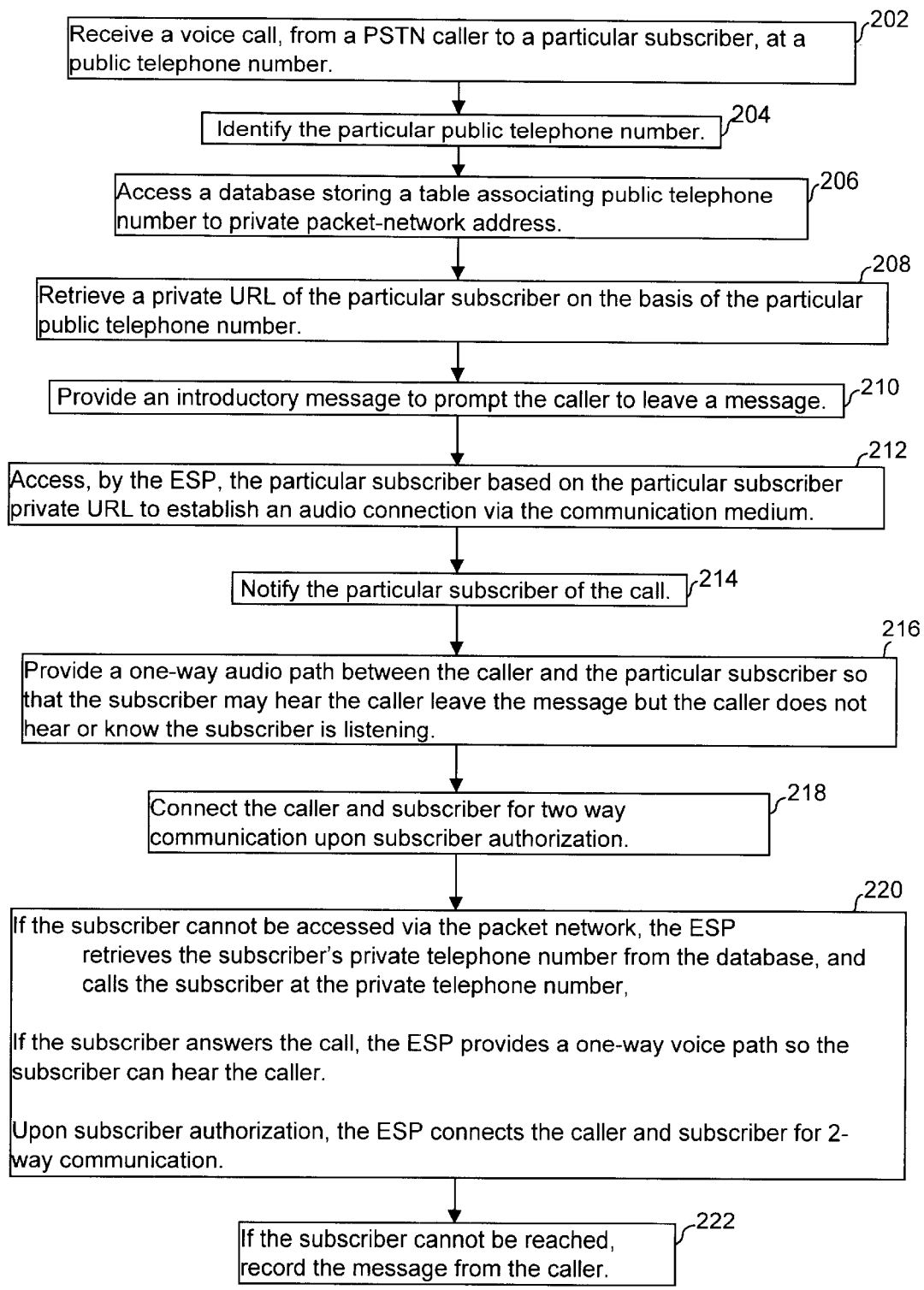
FIG. 4 is a flowchart of a mixed media call screening method from a caller to a subscriber, in which the caller calls the enhanced services platform using a public telephone number over the public switched telephone network, and the enhanced services platform connects the caller to the subscriber using the subscriber's packet network address.

In FIG. 4 a flowchart of an embodiment of the call screening method of the present invention is shown and will be explained with reference to FIG. 2. The call screening method of FIG. 4 allows a subscriber to screen calls made to the subscriber from callers using the Public Switched Telephone network, while the subscriber uses another communication medium. In one embodiment, the communication medium is a packet network. In a more particular embodiment, the packet network is an internet.

A caller 82 places a first call 84 from a communication device 88 using a particular public telephone number for a particular subscriber 86. The first call 84 passes through the circuit switched network 22 to the ESP 60 as described above. In step 202, the ESP 60 receives the first call 84 from the caller 82 using the particular public telephone number for the particular subscriber 86. In one embodiment, the particular public telephone number is from an advertisement.

In step 204, the ESP 60 identifies the particular public telephone number for the particular subscriber. In one embodiment, the particular public telephone number is a DID line connected to a port on the ESP 60. The ESP 60 identifies the particular public telephone number associated with a predefined port on the ESP 60. A table in the ESP 60 provides a mapping of telephone numbers to ports.

In step 206, the ESP 60 accesses a database storing a table that associates a public telephone number and a private URL for each subscriber. In one embodiment, the database is stored on the ESP 60. In step 208, the ESP 60 retrieves from the database a private URL of the particular subscriber 86 on the basis of the particular public telephone number. In an alternate embodiment, steps 206 and 208 are combined. In step 210, the ESP 60 provides an introductory message to the caller 82 in communication with the ESP 60 and prompts the caller 82 to leave a message. In one embodiment, the introductory message prompts the caller 82 to state his name. In an alternate embodiment, the introductory message prompts the caller 82 to leave a message.

In step 212, the ESP 60 accesses the particular subscriber 86 based on the particular subscriber private URL to establish an audio connection via the communication medium. In particular, the ESP 60 uses the particular subscriber private URL to access the ISP 134 via the packet-based network 24. The ESP 60 determines if the subscriber 86 is logged-on to the ISP 134 via a query. Alternately, if the subscriber is using a presence client, the ESP 60 determines that the subscriber is logged in, because the subscriber will have an active connection to the ESP 60.

If the subscriber is logged-on to the ISP 134, in step 214, the particular subscriber is notified of the first call via their connection to the ISP 134. Because the subscriber's computer 106 is executing the packet-phone procedure 130, the ESP 60, via the packet-based network 24 and the ISP 134, sends a message informing the subscriber that they have an incoming call. The message is a well-known CALL SETUP message as defined in the H.225.0 standard which defines the signaling between an H.323 device and the network. In one embodiment, in response to that message, the Packet phone procedure 130 causes a popup window to be generated on the display 128 informing the subscriber of the call. The popup window also has buttons allowing the subscriber to take the call, redirect the call to a telephone, send the call to voice mail, deny the call, hear the introduction as in voice call screening, or hear the caller leave a voice message as in eavesdropping.

In this way, if a subscriber 86 is using their web browser 128 to "surf" the web and has only one phone connection 102 to the PSTN, the subscriber 86 can still receive the incoming call 84.

In step 216, if the particular subscriber answers the first call, such as by clicking on a "screen call" button on the pop-up window, the packet phone procedure 130 sends a message to the ESP 60 via the modem 108, the interconnection 102, the circuit switched network 22, the communication medium 136, the ISP 134, the interconnection 138, the packet-based network 24 and the interconnection 140. In response to the received message, the ESP 60 provides a one-way communication path between the caller and the particular subscriber via the communication medium so that the particular subscriber may hear the caller leave the message but the caller does not hear or know that the particular subscriber is listening.

In an alternate embodiment, the packet phone procedure 130 on the subscriber's computer 94 does not send a message to the ESP 60, but provides the one-way communication path between the caller and the particular subscriber via the communication medium so that the particular subscriber may hear the caller leave the message but the caller does not hear or know that the particular subscriber is listening. In this embodiment, the ESP 60 provides a two-way communication path between the caller 82 and the subscriber's computer 106.

In step 218, the ESP 60 connects the caller 82 and the particular subscriber 86 for two-way communication upon the acceptance of the particular subscriber 86. In particular, the popup window of the packet-phone procedure 130 has a "Take Call" button that the user clicks on to initiate two-way communication between the caller 82 and the subscriber 86.

In step 220, if the particular subscriber 86 cannot be accessed via the packet-based network 24, the ESP 60 retrieves the private telephone number of the particular subscriber 86 on the basis of the particular public telephone number, and places a second call to the particular subscriber 86 using the particular private telephone number via the public switched telephone network 22. If the particular subscriber 86 answers the second call, the ESP 60 provides a one-way communication path between the caller 82 and the particular subscriber 86 so that the particular subscriber 86 may hear the caller leave the message but the caller 86 does not hear or know that the particular subscriber is listening. Call screening using the PSTN is well-known in the art. U.S. Pat. No. 5,361,295. to Solomon et al., is hereby incorporated by reference as background information on call screening using the PSTN.

In step 222, if the particular subscriber 86 cannot be reached, the ESP 60 records the message of the caller for later playback to the particular subscriber.

The Enhanced Services Platform

Figure 5:
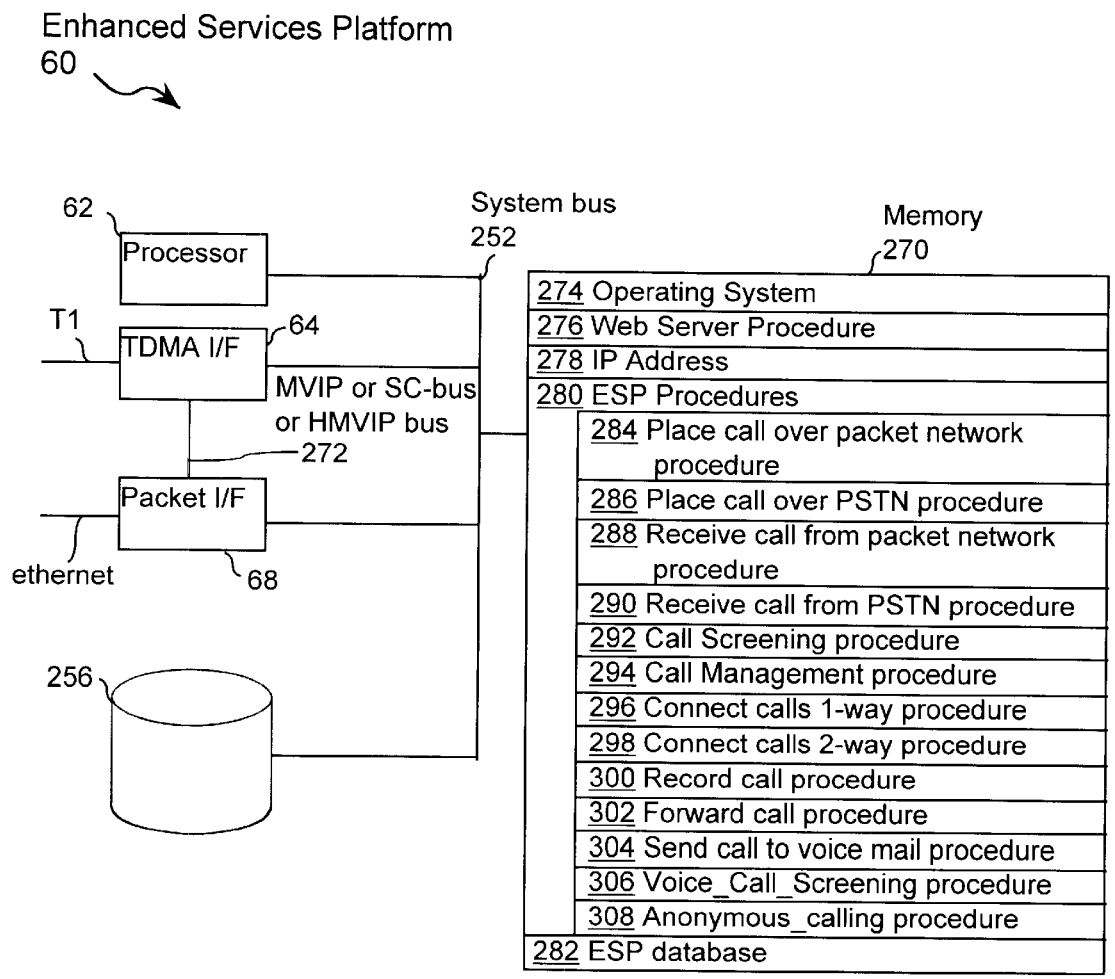
FIG. 5 is a block diagram of the enhanced services platform showing the memory which stores procedures implementing the method of call screening of FIG. 4.

In the ESP 60 shown in FIG. 5, a system bus 252 connects the ESP processing unit 62, the TDMA interface (I/F) 64, the packet interface 68, a disk drive 256 and a memory 270. The TDMA I/F 64 connects to a T1 line and the packet I/F 68 connects to an ethernet. A bus 272, such as an MVIP, SC-bus or HMVIP bus, interconnects the TDMA I/F 64 directly to the packet I/F 68. The memory 270 stores variables and procedures including instructions for execution by the ESP processing unit 62. The variables and procedures include:

An operating system 274 such as UNIX or windows;

A web server procedure 276 that causes the ESP 60 to act as a web server with respect to the packet-based network 24 and to provide an user interface to the packet-based network 24;

An IP address 278 for the ESP 60;

A set of ESP procedures 280 that provide the ESP 60 functionality; and

An ESP database 282 storing information used by the ESP procedures 280.

The ESP procedures 280 include:

A place call over packet network procedure 284 that causes the ESP 60 to place a call over the packet-based network 24 (FIG. 1) using the packet I/F 68;

A place call over PSTN procedure 286 that uses the TDMA I/F 64;

A receive call from packet network procedure 288 via the packet I/F 68;

A receive call from PSTN procedure 290 via the TDMA I/F 64;

A call screening procedure 292 that implements the flowchart of FIG. 4;

A call management procedure 294 that implements the flowchart of FIGS. 8–10, discussed below;

A connect calls 1-way procedure 296 that provides a one-way connection between the caller and the subscriber such that the subscriber can hear, but not communicate with, the caller;

A connect calls 2-way procedure 298 that provides a bidirectional call path between the caller and the subscriber such that the subscriber and the caller can both hear and communicate with each other;

A record call procedure 300 that records a message from the caller;

A forward call procedure 302 that, upon subscriber request, forwards the call to a designated telephone number that may be stored in the ESP database 282;

A send call to voice mail procedure 304 that, upon subscriber request, sends the call to a designated voice mail system;

A voice_call_screening procedure 306 that will be discussed below; and

An anonymous_calling procedure 308 that will also be discussed below.

Except for the call screening procedure 292 and the call management procedure 294, the procedures to place calls and receive calls from both the internet and the PSTN are well-known.

In a preferred embodiment, the present invention uses the International Telecommunications Union ITU-T Recommendation H.323 multimedia communications standard. This recommendation defines the components, procedures and protocols to provide audio and visual communication in packet-switched networks, regardless of the ultimate physical layer. TCP/IP protocols are used in conjunction with H.323. In one aspect of the invention, the one-way and two-way communication paths include a video signal with the audio signal.

Figure 6:
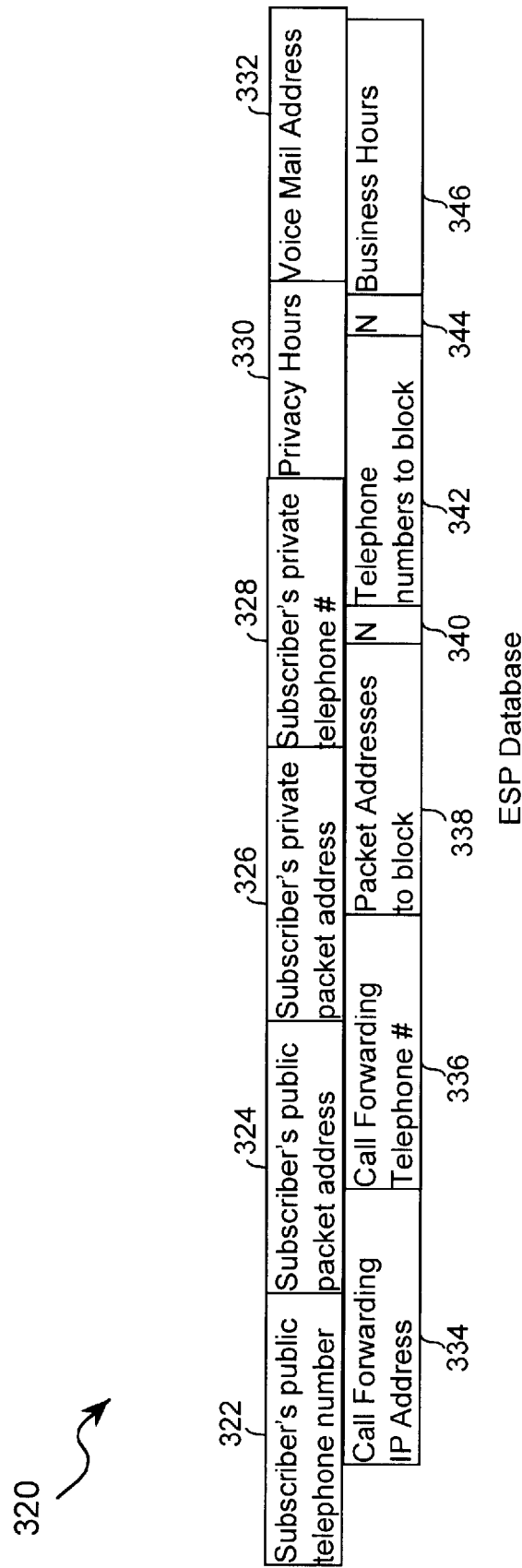
FIG. 6 depicts an exemplary format for a record for the database of the enhanced services platform.

In FIG. 6 in the ESP database 282 for a subscriber, an exemplary record 320 includes: the subscriber's public telephone number 322, the subscriber's public packet address 324, the subscriber's private packet (IP, URL) address 326, the subscriber's private telephone number 328, a set of specified privacy hours 330, a voice mail address 332, a call forwarding IP address 334, a call forwarding telephone number 336, a set of packet addresses to block 338, a field to indicate whether packet address blocking notification is enabled 340, a set of telephone numbers to block 342, a field to indicate whether telephone number blocking notification is enabled 344, and a set of business hours 346. Note that while privacy hours state when the system should not call the subscriber, business hours state when the system should call the subscriber. The call forwarding IP address is another IP address different from the subscriber's private packet address 326 to which the subscriber can forward calls.

Figure 7:
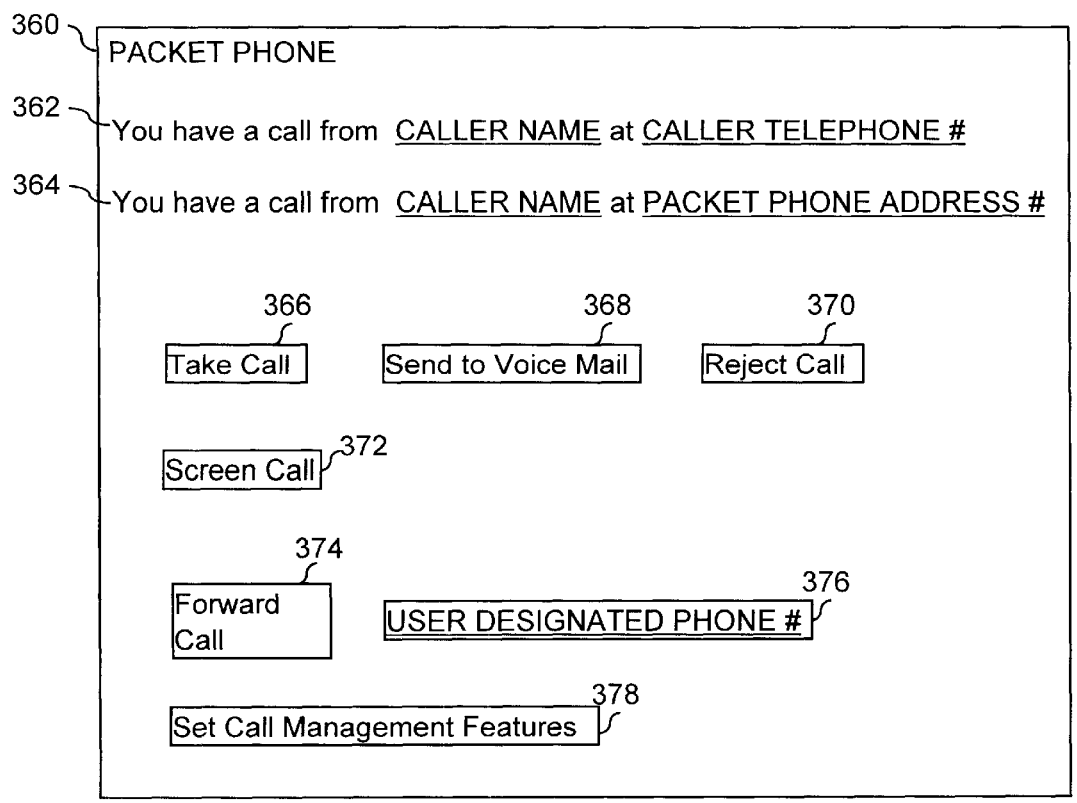
FIG. 7 is a diagram of an exemplary graphical user interface for screening a call received from the internet via the enhanced services platform.

In FIG. 7, an exemplary graphical user interface of the notification screen 360 of the packet phone procedure is shown. This notification screen 360 displays the incoming source of the call. A text field 362 displays the caller's name and telephone number. The ESP acquires this data from an automatic numbering identification feature, also referred to as caller-id, and sends it to the packet phone procedure via the ISP. Alternately, if the source of the call was from another internet user, line 364 displays the caller's name and packet phone address, such as a URL or IP address.

A set of buttons allows the subscriber to control the call. A "take call" button 366 allows the subscriber to talk with the caller immediately. A "send to voice mail" button 368 allows the subscriber to send the call to the subscriber's designated voice mail system. A "reject call" button 370 allows the subscriber to reject the call and the ESP will inform the caller that the subscriber is not available.

In the present invention, a "screen call" button 372 allows the subscriber to listen to the caller without the caller knowing that the subscriber hears the caller. After clicking on the "screen call" button, the subscriber hears the caller leave a message. In an alternate embodiment, described below, clicking on the "screen call" button causes the ESP to play the caller's recorded message, instead of allowing the subscriber to "eavesdrop" as the message is being recorded.

A "forward call" button 374 allows the subscriber to forward the call to a default or to a specified telephone number 376. A "set call management features" button 378 allows the user to control call handling.

Figure 8:
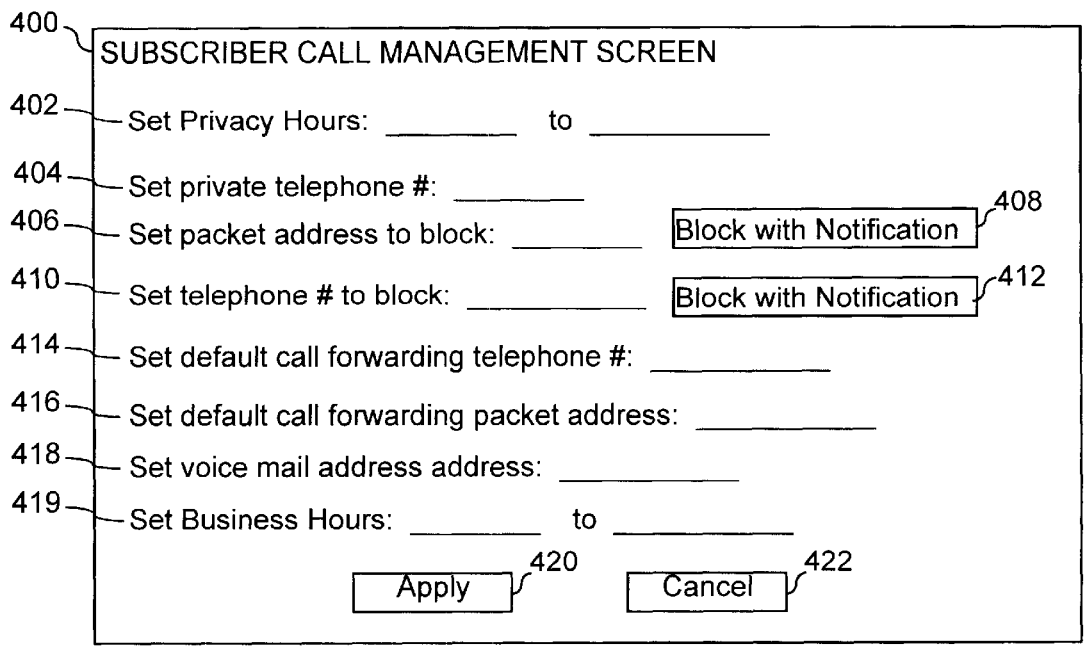
FIG. 8 is a diagram of an exemplary graphical user interface of a call management procedure for configuring the call screening procedure of the enhanced services platform.
Figure 9:
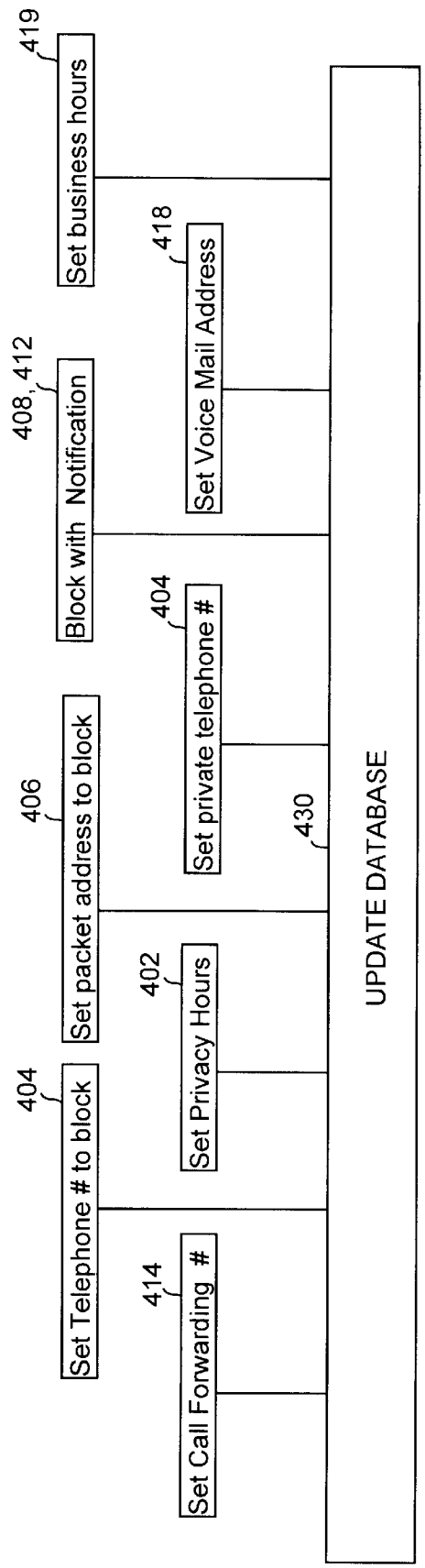
FIG. 9 is a flowchart of a method of implementing the call management procedure of FIG. 8.

FIG. 8 shows an exemplary graphical user interface of a call management screen 400 implemented in the call management procedure 294 of FIG. 5. The call management screen 400 is displayed in response to the subscriber's clicking on the "set call management features" button of FIG. 7. The subscriber can set privacy hours 402, their private telephone number 404, packet addresses or portions thereof to block 406 such as "*.gov", whether the caller using the packet address is notified of the blocking 408, telephone numbers or portions thereof to block 410 such as "212*", whether callers using telephone numbers are notified of the blocking 412, a default call forwarding telephone number 414, a default call forwarding packet address 416, such as a URL or IP address, the voice mail address 418, and the business hours 419. Referring also to FIG. 9, when the user clicks on an apply button 420, the call management procedure updates the subscriber's record 320 (See FIG. 6) in the database with the appropriate information in step 430.

Figure 10:
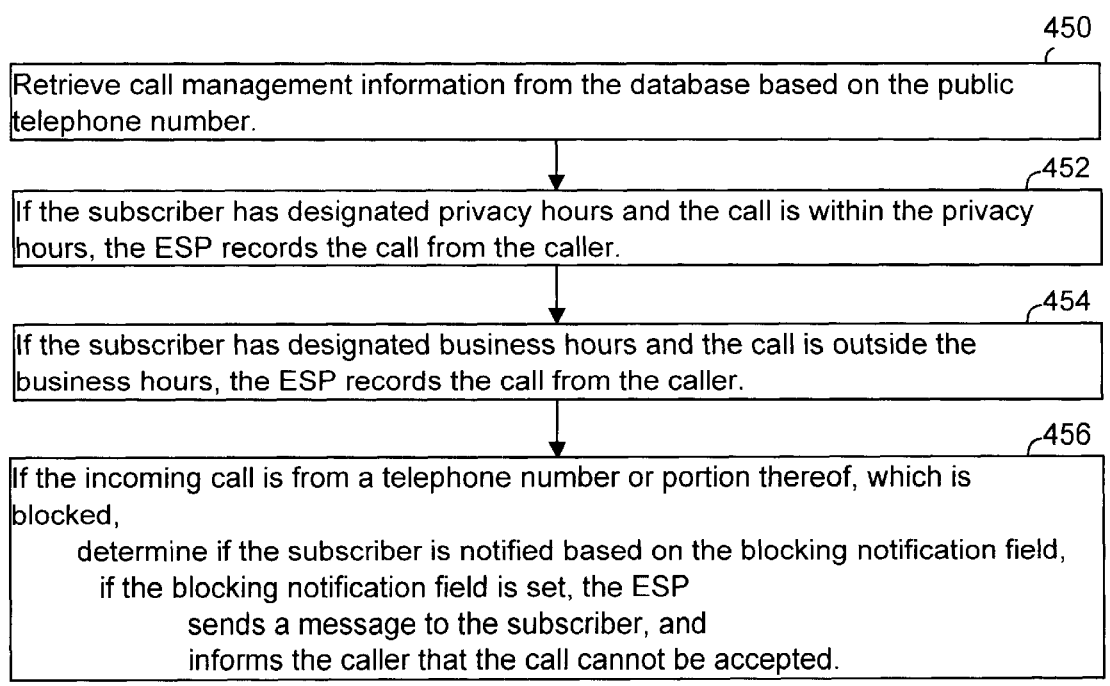
FIG. 10 is a flowchart of a call screening method using the call management features of FIGS. 8 and 9.

Another aspect of the call management procedure also implements step 450–456 of FIG. 10, and is executed after step 206 of FIG. 4. At step 450, the call management information is retrieved from the database based on the public telephone number. Step 452 determines whether the subscriber has set privacy hours. If so, and the call is within the privacy hours, the ESP does not notify the subscriber of the call but records a message from the caller. In step 454, if the subscriber has designated business hours and if call is outside the business hours, the ESP records the call from the caller. Step 456 determines whether the incoming call is from a telephone number, or portion thereof, which is blocked. If so, step 456 determines if the subscriber is notified of the blocking from field 390 (FIG. 6). If so, the ESP sends a message to the subscriber informing the subscriber that a caller from a blocked telephone number attempted placed a call, and informs the caller that the call cannot be accepted.

Figure 11:
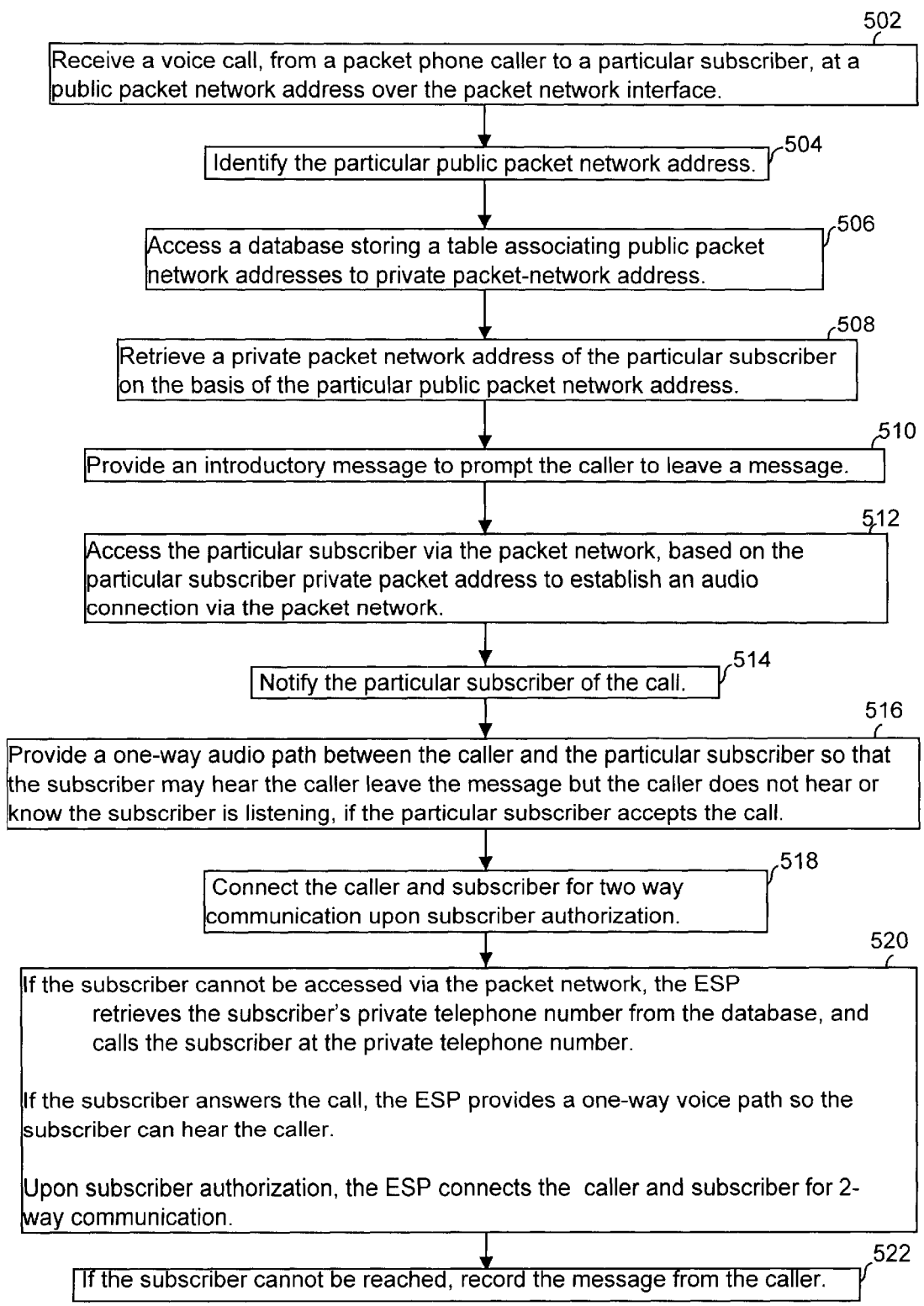
FIG. 11 is a flowchart of a packet-based call screening method between a caller and a subscriber using a public packet address to contact the subscriber.

Another Embodiment: The Caller Calls a Public Packet-Based Address In FIG. 11, a flowchart shows another aspect of the invention. The flowchart of FIG. 11 is similar to the flowchart of FIG. 4 except that the caller is calling from a packet-network. Both the caller and the subscriber use the packet-based network. In step 502, to call the subscriber, the caller uses the subscriber's public packet-based address which is associated with the ESP. Referring also to FIG. 2, the caller 82 may place the call via their ISP 134 which the caller contacted via a modem 182 from the caller's computer 162. Alternately, the caller's computer 182 may directly connect to the packet-based network 24 via the packet interface 190 and not use an ISP 134.

In step 504, the ESP 60 identifies the particular public packet network address for the subscriber based on the public packet network address. In step 506, the ESP 60 accesses a database storing a table, as shown in FIG. 6, associating the public packet network addresses with private packet-network addresses. In step 508, the ESP 60 retrieves a private packet network address of the particular subscriber on the basis of the particular public packet network address. In step 510 which is the same as step 210 of FIG. 4, the ESP provides an introductory message to the caller that prompts the caller to leave a message.

In step 512, the ESP 60 accesses the particular subscriber 86 via the packet network 24, based on the particular subscriber's private packet address to establish an audio connection via the packet network 24. The particular subscriber's private packet network address may either access the subscriber via the ISP 134 or directly access the subscriber via communication medium 164 and the subscriber's packet interface 152.

Steps 514, 516, 518, 520 and 522 are the same as steps 214, 216, 218, 220 and 222 of FIG. 4 that were described above.

Figure 12:
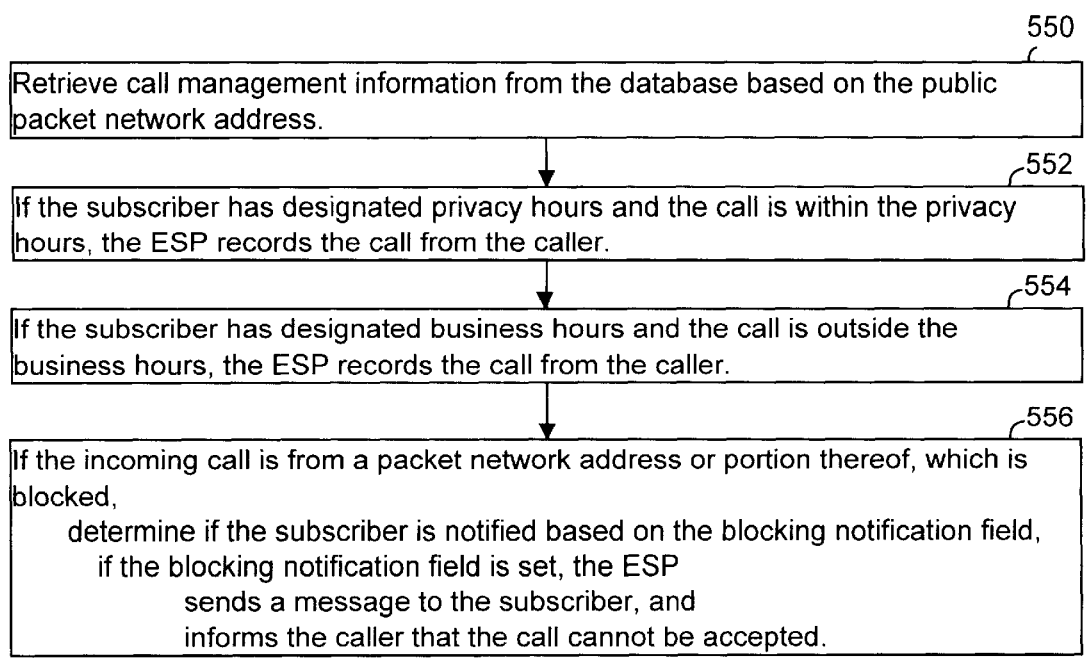
FIG. 12 is a flowchart of the call screening method using the call management features of FIG. 10 for a subscriber and a caller that both use the packet network.

In FIG. 12, for a packet-based caller, the call management procedure of (294, FIG. 5) implements steps 550–556. The call management procedure of FIG. 12 is executed after step 506 of FIG. 11. In step 550, the call management information is retrieved from the database based on the public packet network address of the subscriber. Step 552 determines whether the subscriber has set privacy hours. If so, and the call is within the privacy hours, the ESP does not notify the subscriber of the call but records a message from the caller. In step 554, determines whether the subscriber has set business hours. If so, and the call is outside the business hours, the ESP does not notify the subscriber of the call but records a message from the caller. In step 556, the call management procedure determines if the incoming call is from a packet address or portion thereof which is blocked. If so and if the blocking notification field 344 of FIG. 6 is set, the ESP sends a message to the subscriber informing the subscriber that a caller from a blocked telephone number attempted placed a call, and informs the caller that the call cannot be accepted.

Voice Call Screening

Figure 13:
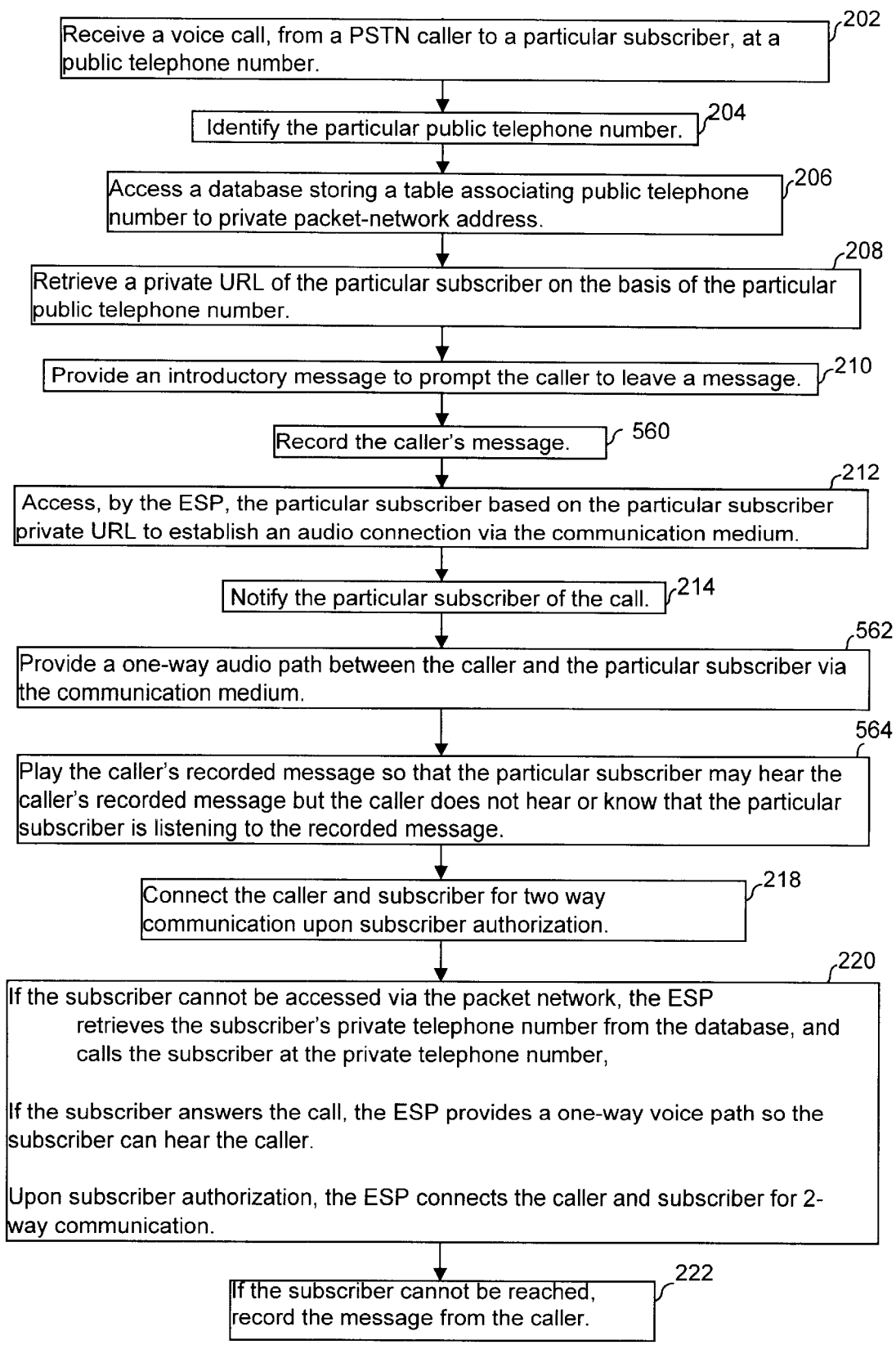
FIG. 13 is a flowchart of a mixed media voice call screening method from a caller to a subscriber, in which the caller calls the enhanced services platform using a public telephone number over the public switched telephone network, and the enhanced services platform connects the caller to the subscriber using the subscriber's packet network address.

In the flowchart of FIG. 13, a method for voice call screening is shown. The method of FIG. 13 is implemented by the voice_call_screening procedure 306 of FIG. 5. The voice call screening method of FIG. 13 differs from the call screening method of FIG. 4. In the voice call screening method of FIG. 13, after the ESP prompts the caller to leave a message, the ESP records the caller's message. When the ESP establishes the one-way audio path to the subscriber, instead of allowing the caller to "eavesdrop" on the caller's message as it is being recorded, the ESP plays the recorded message to the subscriber.

Many of the steps of FIG. 13 are the same as the steps of FIG. 4, therefore, the same step numbers will be used for those steps and those will not be described. In FIG. 13, steps 202 through 210 are the same as in FIG. 4. After step 210, in step 560, the ESP records the caller's message. Steps 212 and 214 are the same as in FIG. 4. After step 214, in step 562, the ESP provides a one-way audio path between the caller and the particular subscriber via the communication medium. In step 564, the ESP plays the caller's recorded message so that the particular subscriber may hear the caller's recorded message but the caller does not hear or know that the particular subscriber is listening to the recorded message. Steps 218 through 222 the same as in FIG. 4.

Figure 14:
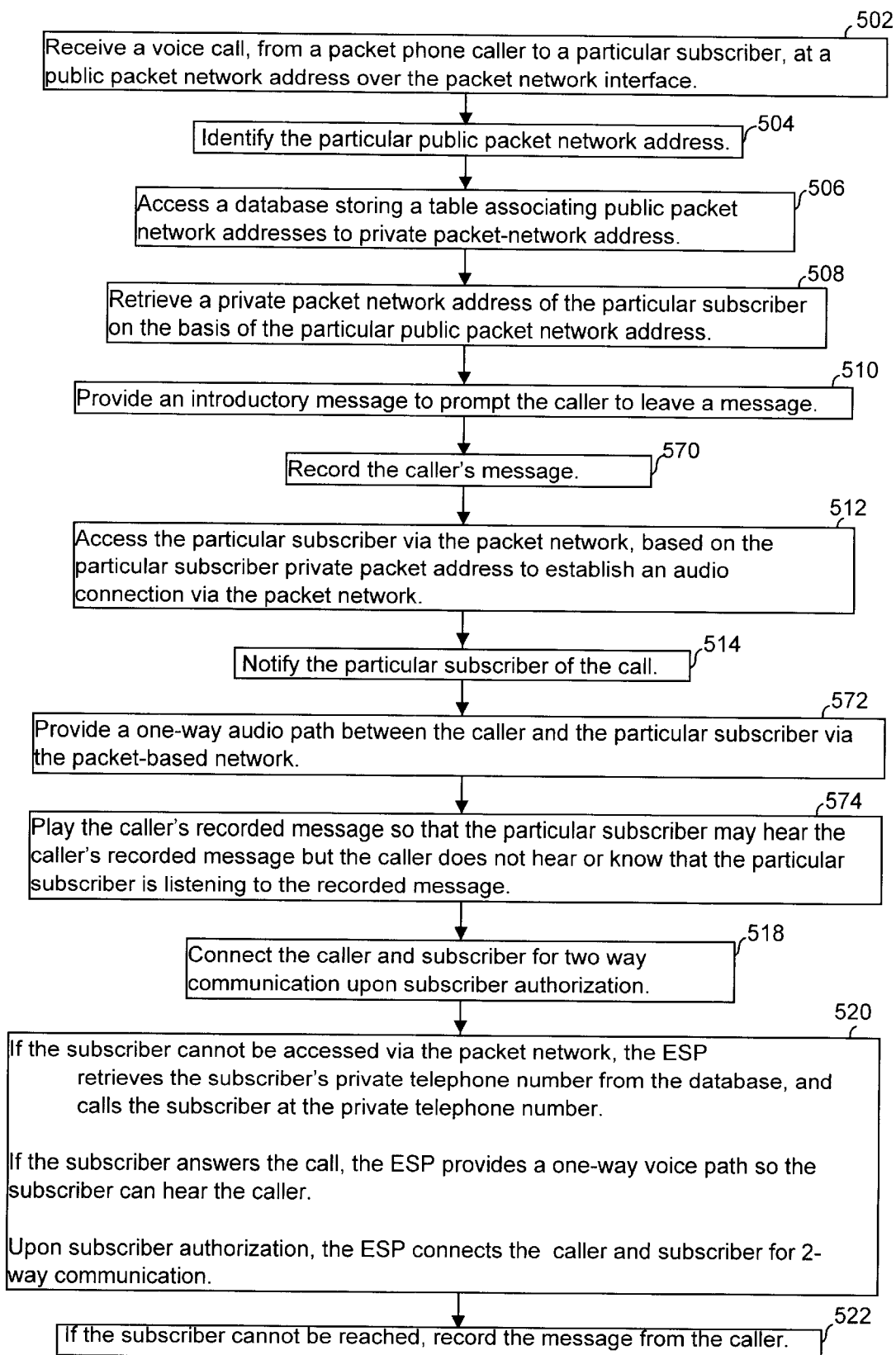
FIG. 14 is a flowchart of a packet-based voice call screening method between a caller and a subscriber using a public packet address to contact the subscriber.

In FIG. 14, a flowchart shows another aspect of the invention of FIG. 13. The flowchart of FIG. 14 is similar to the flowchart of FIG. 13 except that both the caller and the subscriber use the packet-based network. The flowchart of FIG. 14 is similar to the flowchart of FIG. 11 except that, instead of allowing the caller to "eavesdrop" on the caller's message as it is being recorded, the ESP plays the recorded message to the subscriber. In an alternate embodiment, the voice_call_screening procedure 306 of FIG. 5 implements the flowchart of FIG. 14.

Many of the steps of FIG. 14 are the same as the steps of FIG. 11, therefore, the same step numbers will be used for those steps and those steps will not be described. In FIG. 14, steps 502 through 510 are the same as in FIG. 11. In step 570, the ESP records the caller's message. Steps 512 and 514 are the same as in FIG. 11. In step 572, the ESP provides a one-way audio path between the caller and the particular subscriber via the packet-based network. In step 574, the ESP plays the caller's recorded message so that the particular subscriber may hear the caller's recorded message but the caller does not hear or know that the particular subscriber is listening to the recorded message. Steps 518 through 522 are the same as in FIG. 11.

Anonymous Calling

Figure 15:
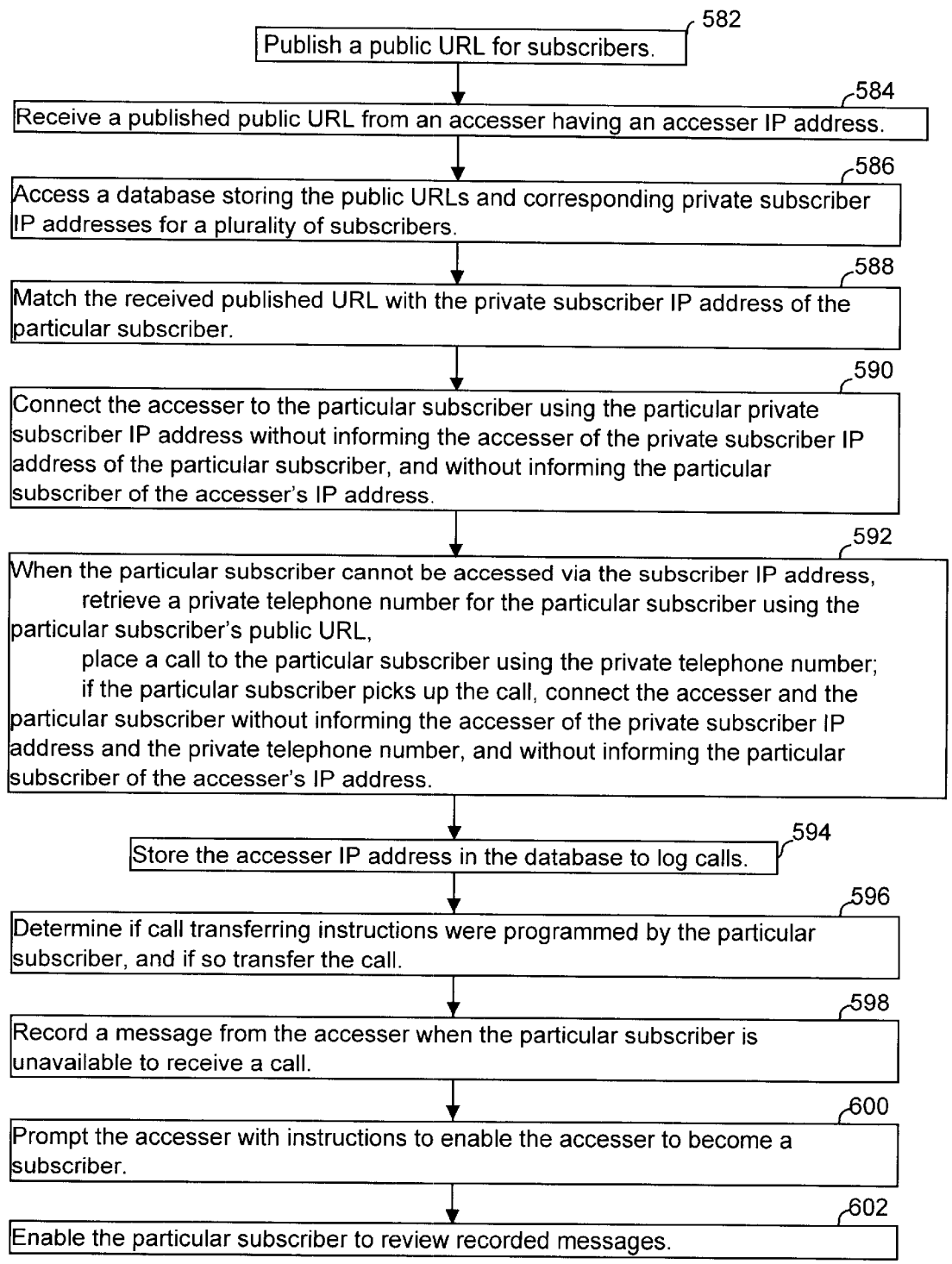
FIG. 15 is a flowchart of a method for anonymous calling between a caller and a subscriber that both use the packet network.

In the flowchart of FIG. 15, the ESP provides a packet-based method that anonymously enables a subscriber to communicate with an accesser. The method allows the accesser to communicate with the subscriber without the accesser knowing the identity of the subscriber prior to establishing communication with the subscriber, but knowing a particular subscriber with whom communication is desired. The method allows the identity of the particular subscriber and the accesser to be kept anonymous during communication between the particular subscriber and the accesser unless voluntarily revealed by either the particular subscriber or the accesser. The anonymous calling procedure 308 of FIG. 5 implements the flowchart of FIG. 15.

In step 582, a public URL is published for subscribers. For example, the URL may be published on a web page or on a business card. In step 584, the ESP receives a public URL from an accesser via the internet. In step 586, the ESP accesses a database storing the public URLs and the private subscriber IP addresses for the subscribers. In step 588, the ESP matches the received public URL with the private subscriber IP address of the particular subscriber station. In step 590, the ESP establishes a two-way call connection over the internet and connects the accesser to the particular subscriber using the private subscriber IP address without informing the accesser of the private subscriber IP address of the particular subscriber, and without informing the particular subscriber of the accesser's IP address.

In step 592, when the particular subscriber cannot be accessed via the private subscriber IP address, the ESP attempts to connect the accesser to the caller using the PSTN. In particular, the ESP retrieves a private telephone number for the particular subscriber using the particular subscriber's published URL. The ESP places a call to the particular subscriber using the private telephone number. If the particular subscriber picks up the call, the ESP connects the accesser and the particular subscriber without informing the accesser of the subscriber's IP address and private telephone number, and without informing the particular subscriber of the accesser's IP address.

In step 594, the ESP stores the accesser's IP address in the database to log calls to the subscribers. In step 596, when the subscriber cannot be reached in step 592, the ESP determines if call transferring instructions were programmed by the particular subscriber, and if so, transfers the call. If there were no call transferring instructions, in step 598, the ESP records a message from the accesser. Alternately, the ESP records the message after step 592, when the first attempt at a connection failed. In step 600, the ESP prompts the accesser with instructions to enable the accesser to become a subscriber. In step 602, the ESP enables the particular subscriber to review recorded messages.

Figure 16:
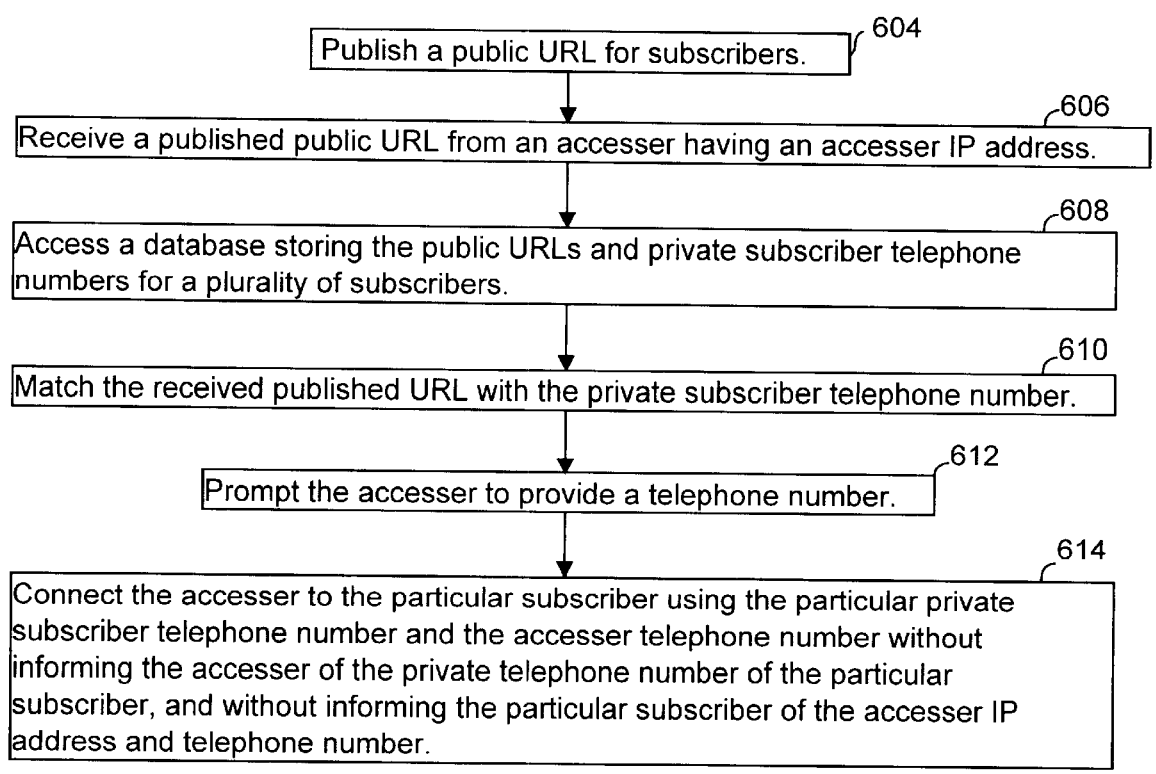
FIG. 16 is a flowchart of an alternate method for anonymous calling in which an accesser uses a packet network and the subscriber uses the public switched telephone network.

In FIG. 16 an alternate embodiment for anonymous calling allows an internet based accesser to contact a subscriber using the PSTN. In this embodiment, the accesser needs a telephone number different from the telephone number for the telephone line that the subscriber may be using to access the ESP.

In step 604, the subscribers publish public URLs as described above. In step 606, the ESP receives a published public URL from an accesser having an accesser IP address. In step 608, the ESP accesses a database storing the public URLs and private subscriber telephone numbers for a plurality of subscribers. In step 610, the ESP matches the received public URL with the private subscriber telephone number. In step 612, the ESP prompts the accesser to provide a telephone number. In step 614, the ESP connects the accesser to the particular subscriber using the matched private subscriber telephone number and the accesser's telephone number. The ESP does not inform the accesser of the of the particular subscriber's private telephone number, and does not inform the particular subscriber of the accesser's IP address and telephone number.

Figure 17:
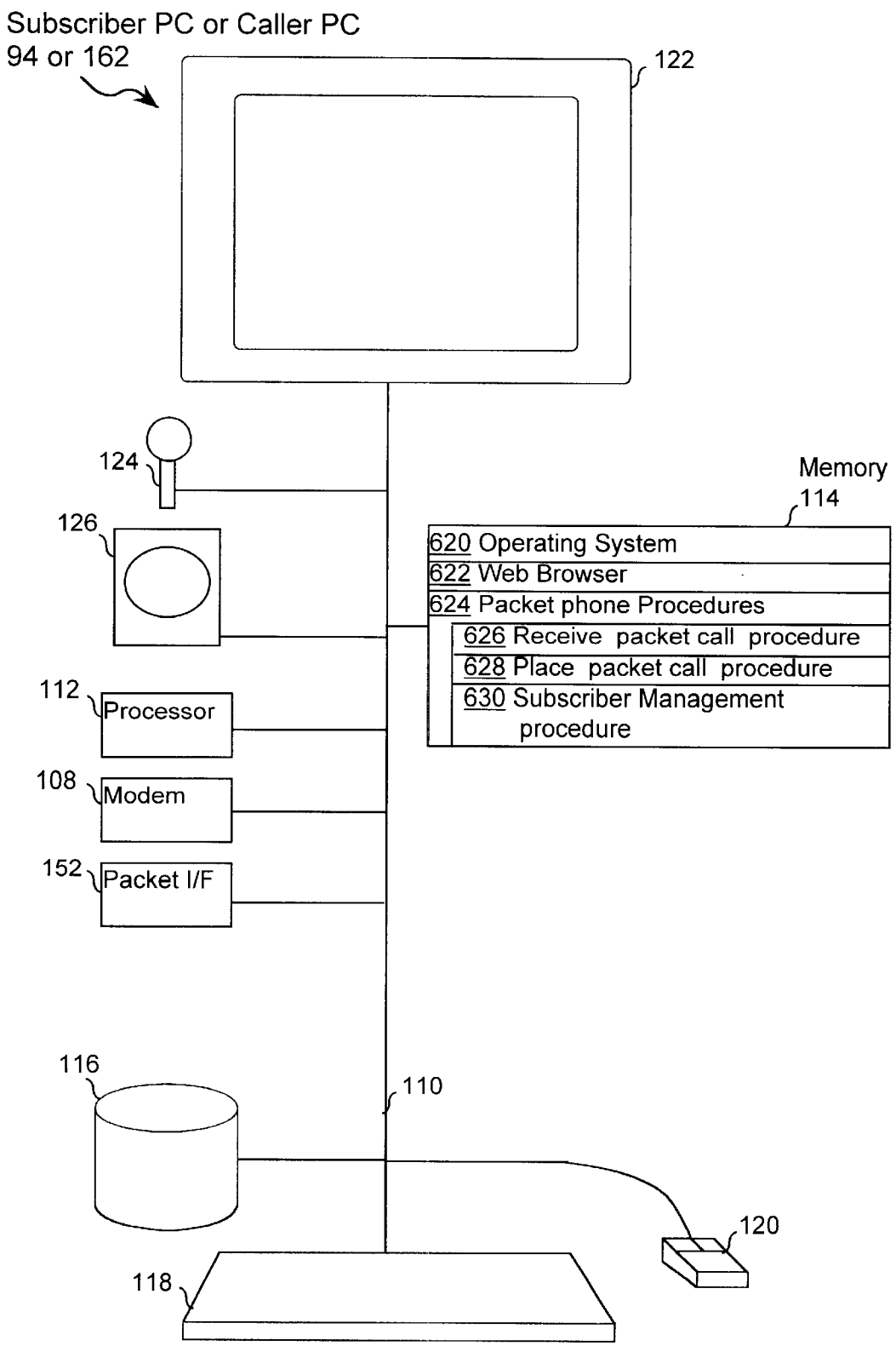
FIG. 17 is a block diagram of an exemplary computer for use by either the subscriber or caller using the packet phone procedures of the present invention.

FIG. 17 is an exemplary computer that can be used by the subscriber or the caller. The computer system of FIG. 17, the memory 114 stores an operating system 620, a web browser procedure 622 and a packet phone procedure 624. The packet phone procedure 624 includes a receive packet call procedure 626, a place packet call procedure 628 and a subscriber call management procedure 630 to update the subscriber's database in the ESP, as described above.

Although the invention has been described using a packet address that is a private URL, in an alternate embodiment, the packet address and addressing methods include any of the following:

server-based lookup based on an email address;
H.323 addressing;
IP addressing using the numerical IP address;
E.164 telephone addressing;
X.121 data addressing; and
E.166 telephone/data addressing.

Note that, in H.323 addressing, an H.323 identifier is a string of ISO/IEC 10646-1 characters as defined in the International Telecommunications Union ITU-T Recommendation H.225.0. The string includes any of the following: a user name, a conference name, an email name, or other identifier.

In server-based lookup, the subscriber publishes an email address instead of a public URL. The ESP database associates the public email address with the private IP address or voice telephone number. The ESP receives an email from caller at the published email address, looks up the public email address in the database, and translates the email address to the subscriber's private email address. Alternately, instead of an email address, a voice mail address is used.

The present invention has the advantages of providing flexibility, and allows subscribers to screen calls from callers from packet-based networks with packet addresses. In addition, the invention allows subscribers to receive and screen calls from a single telephone connection even when that connection is otherwise "busy" because the subscriber is connected to a packet-based network via their ISP. In another aspect of the invention, the ESP provides for anonymous calling between subscribers and accessers using the internet, and when the internet connection is in use the subscriber may be called anonymously at a designated telephone number using the PSTN.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A call screening method for allowing a subscriber to screen calls made to the subscriber from callers, comprising:

receiving a first call at an enhanced service platform unit from a caller who uses a particular public address to indicate a call destination associated with a particular subscriber; the particular public address selected from the group consisting of a public telephone number associated with the particular subscriber and a public packet-based address associated with the particular subscriber;

accessing a database storing a public address and a private packet-based address for each subscriber to retrieve a private packet-based address of the particular subscriber on the basis of the particular public address;

providing an introductory message to the caller in communication with the enhanced service platform unit and prompting the caller to leave a message;

accessing the particular subscriber based on the retrieved private packet-based address to establish an audio connection via a packet-based network;

notifying the particular subscriber of the first call;

when the particular subscriber answers the first call, providing a one-way communication path between the caller and the particular subscriber via the packet-based network so that the particular subscriber may hear the caller leave the message but the caller does not hear or know that the particular subscriber is listening; and connecting the caller and the particular subscriber for two-way communication upon authorization by the particular subscriber.

2. The method of claim 1, wherein the database stores the public address, the private packet-based address and a private telephone number for each subscriber;

when the particular subscriber cannot be accessed via the packet-based network, the method further comprises:
retrieving the private telephone number of the particular subscriber on the basis of the particular public address;

placing a second call to the particular subscriber using the retrieved private telephone number via the public switched telephone network; and when the particular subscriber answers the second call, providing a one-way communication path between the caller and the particular subscriber so that the particular subscriber may hear the caller leave the message but the caller does not hear or know that the particular subscriber is listening.

3. The method of claim 1, further comprising designating, by the subscriber, at least one subscriber configuration value selected from the group consisting of (A) privacy hours during which the ESP will not connect callers to the subscriber, (B) a voice mail address to record calls, (C) a call forwarding packet-based address, (D) a call forwarding telephone number, (E) at least one telephone number to block, (F) at least one packet-based address to block, and (G) business hours during which the ESP will connect callers to the subscriber.

4. The method of claim 1, wherein the private packet based address is selected from the set consisting of a URL, an email address, a voice-mail address, and an H.323 address.

5. The method of claim 1, wherein the public packet-based address is selected from the set consisting of a URL, an email address, a voice-mail address, and an H.323 address.

6. A call screening method for allowing a subscriber to screen calls made to the subscriber from callers, comprising:

receiving a first call at an enhanced service platform unit from a caller who uses a particular public address to indicate a call destination associated with a particular subscriber; the particular public address selected from the group consisting of a public telephone number associated with the particular subscriber and a public packet-based address associated with the particular subscriber;

accessing a database storing a public address, a private telephone number and a private packet-based address for each subscriber to retrieve a private telephone number of the particular subscriber on the basis of the particular public address;

providing an introductory message to the caller in communication with the enhanced service platform unit and prompting the caller to leave a message;

accessing the particular subscriber via a public switched telephone network based on the particular subscriber private telephone number to establish an audio connection;

notifying the particular subscriber of the first call;

when the particular subscriber answers the first call, providing a one-way communication path between the caller and the particular subscriber via the public switched telephone network so that the particular subscriber may hear the caller leave the message but the caller does not hear or know that the particular subscriber is listening;

connecting the caller and the particular subscriber for two-way communication upon authorization by the particular subscriber;

when the particular subscriber cannot be accessed via the public switched telephone network:

retrieving from the database the private packet-based address of the particular subscriber on the basis of the particular public address;

placing a second call to the particular subscriber using the retrieved private packet-based address via the packet-based network; and when the particular subscriber answers the second call, providing a one-way communication path between the caller and the particular subscriber so that the particular subscriber may hear the caller leave the message but the caller does not hear or know that the particular subscriber is listening.

7. The method of claim 6, further comprising:

after said step of providing an introductory message and in response to the prompting the caller to leave the message, recording the caller's message; and wherein said step of providing a one-way communication path includes playing the caller's recorded message so that the particular subscriber may hear the caller leave the message but the caller does not hear or know that the particular subscriber is listening.

8. The method of claim 6, further comprising designating, by the subscriber, at least one subscriber configuration value selected from the group consisting of (A) privacy hours during which the ESP will not connect callers to the subscriber, (B) a voice mail address to record calls, (C) a call forwarding packet-based address, (D) a call forwarding telephone number, (E) at least one telephone number to block, (F) at least one packet-based address to block, and (G) business hours during which the ESP will connect callers to the subscriber.

9. The method of claim 6, wherein the public packet-based address is selected from the set consisting of a URL, an email address, a voice-mail address, and an H.323 address.

10. The method of claim 6, wherein the public packet-based address is selected from the set consisting of a URL, an email address, a voice-mail address, and an H.323 address.

11. An enhanced services platform for allowing a subscriber to screen calls made to the subscriber, comprising:

a processor;

a first interface coupled to a public switched telephone network;

a second interface coupled to a packet-based network;

a memory having a database storing a public address and a private packet-based address for each subscriber;

at least one bus connecting the processor, the memory, the first interface and the second interface;

the memory storing a call processing module, the call processing module including instructions for execution by the processor for:

receiving a first call via the first or second interface from a caller who uses a particular public address to indicate a call destination associated with a particular subscriber; the particular public address selected from the group consisting of a public telephone number associated with the particular subscriber and a public packet-based address associated with the particular subscriber;

accessing the database to retrieve a private packet-based address of the particular subscriber on the basis of the particular public address;

providing an introductory message to the caller and prompting the caller to leave a message via the first interface;

accessing the particular subscriber based on the retrieved private packet-based address to establish a communication connection via the packet-based network;

notifying the particular subscriber of the first call via the packet-based network;

when the particular subscriber answers the first call, providing a one-way communication path between the caller and the particular subscriber via the communication medium so that the particular subscriber may hear the caller leave the message but the caller does not hear or know that the particular subscriber is listening; and connecting the caller and the particular subscriber for two-way communication upon authorization by the particular subscriber.

12. The enhanced service platform of claim 11, wherein the database stores the public address, the private packet-based address and a private telephone number for each subscriber;

the call processing module includes additional instructions, activated when the particular subscriber cannot be accessed via the packet-based network, the additional instructions for:

retrieving the private telephone number of the particular subscriber on the basis of the particular public address;

placing a second call to the particular subscriber using the retrieved private telephone number via the public switched telephone network; and when the particular subscriber answers the second call, providing a one-way communication path between the caller and the particular subscriber so that the particular subscriber may hear the caller leave the message but the caller does not hear or know that the particular subscriber is listening.

13. The enhanced service platform of claim 11, wherein the memory includes a subscriber account configuration module having instructions for enabling the subscriber to designate at least one subscriber configuration value selected from the group consisting of (A) privacy hours during which the ESP will not connect callers to the subscriber, (B) a voice mail address to record calls, (C) a call forwarding packet-based address, (D) a call forwarding telephone number, (E) at least one telephone number to block, (F) at least one packet-based address to block, and (G) business hours during which the ESP will connect callers to the subscriber.

14. The enhanced service platform of claim 11, wherein the public packet-based address is selected from the set consisting of a URL, an email address, a voice-mail address, and an H.323 address.

15. The enhanced service platform of claim 11, wherein the private packet based address is selected from the set consisting of a URL, an email address, a voice-mail address, and an H.323 address.

16. An enhanced services platform for allowing a subscriber to screen calls made to the subscriber, comprising:

a processor;

a first interface coupled to a public switched telephone network;

a second interface coupled to a packet-based network;

a memory having a database storing a public address, a private telephone number and a private packet-based address for each subscriber;

at least one bus connecting the processor, the memory, the first interface and the second interface;

the memory storing a call processing module, the call processing module including instructions for execution by the processor for:

receiving a first call via the first or second interface from a caller who uses a particular public address to indicate a call destination associated with a particular subscriber; the particular public address selected from the group consisting of a public telephone number associated with the particular subscriber and a public packet-based address associated with the particular subscriber;

accessing the database to retrieve a private telephone number of the particular subscriber on the basis of the particular public address;

providing an introductory message to the caller in communication with the enhanced service platform unit and prompting the caller to leave a message;

accessing the particular subscriber via a public switched telephone network based on the retrieved private telephone number to establish an audio connection;

notifying the particular subscriber of the first call;

when the particular subscriber answers the first call, providing a one-way communication path between the caller and the particular subscriber via the public switched telephone network so that the particular subscriber may hear the caller leave the message but the caller does not hear or know that the particular subscriber is listening;

connecting the caller and the particular subscriber for two-way communication upon authorization by the particular subscriber;

when the particular subscriber cannot be accessed via the public switched telephone network:

retrieving from the database the private packet-based address of the particular subscriber on the basis of the particular public address;

placing a second call to the particular subscriber using the retrieved private packet-based address via the packet-based network; and when the particular subscriber answers the second call, providing a one-way communication path between the caller and the particular subscriber so that the particular subscriber may hear the caller leave the message but the caller does not hear or know that the particular subscriber is listening.

17. The enhanced service platform of claim 16, wherein the memory includes a subscriber account configuration module having instructions for enabling the subscriber to designate at least one subscriber configuration value selected from the group consisting of (A) privacy hours during which th e ESP will not connect callers to the subscriber, (B) a voice mail address to record calls, (C) a call forwarding packet-based address, (D) a call forwarding telephone number, (E) at least one telephone number to block, (F) at least o n e packet-based address to block, and (G) business hours during which the ESP will connect callers to the subscriber.

18. The enhanced service platform of claim 16, wherein the public packet-based address is selected from the set consisting of a URL, an email address, a voice-mail address, and an H.323 address.

19. The enhanced service platform of claim 16, wherein the private packet based address is selected from the set consisting of a URL, an email address, a voice-mail address, and an H.323 address.

20. A computer program product for use in conjunction with a computer system, the computer program product comprising a computer readable storage medium and a computer program mechanism embedded therein, the computer program mechanism comprising:

a call processing module, the call processing module including instructions for execution by the processor for:

receiving a first call from a caller who uses a particular public address to indicate a call destination associated with a particular subscriber; the particular public address selected from the group consisting of a public telephone number associated with the particular subscriber and a public packet-based address associated with the particular subscriber;

accessing a database that stores a public telephone number and a private packet-based address for each subscriber and retrieving from the database a private packet-based address of the particular subscriber on the basis of the particular public telephone number;

providing an introductory message to the caller and prompting the caller to leave a message;

accessing the particular subscriber based on the particular subscriber private packet-based address to establish a communication connection via a packet-based network;

notifying the particular subscriber of the first call via the packet-based network;

when the particular subscriber answers the first call, providing a one-way communication path between the caller and the particular subscriber via the packet-based network so that the particular subscriber may hear the caller leave the message but the caller does not hear or know that the particular subscriber is listening; and connecting the caller and the particular subscriber for two-way communication upon authorization by the particular subscriber.

21. The computer program product of claim 20, wherein the database accessed by the accessing step stores the public address, the private packet-based address and a private telephone number for each subscriber;

the call processing module includes additional instructions, activated when the particular subscriber cannot be accessed via the communication medium, the additional instructions for:
retrieving the private telephone number of the particular subscriber on the basis of the particular public telephone number;
placing a second call to the particular subscriber using the retrieved private telephone number via the public switched telephone network; and
when the particular subscriber answers the second call, providing a one-way communication path between the caller and the particular subscriber so that the particular subscriber may hear the caller leave the message but the caller does not hear or know that the particular subscriber is listening.

22. The computer program product of claim 20, wherein the memory includes a subscriber account configuration module having instructions for enabling the subscriber to designate at least one subscriber configuration value selected from the group consisting of (A) privacy hours during which the ESP will not connect callers to the subscriber, (B) a voice mail address to record calls, (C) a call forwarding packet-based address, (D) a call forwarding telephone number, (E) at least one telephone number to block, (F) at least one packet-based address to block, and (G) business hours during which the ESP will connect callers to the subscriber.

23. The computer program product of claim 20, wherein the public packet-based address is selected from the set consisting of a URL, an email address, a voice-mail address, and an H.323 address.

24. The computer program product of claim 20, wherein the private packet based address is selected from the set consisting of a URL, an email address, a voice-mail address, and an H.323 address.

25. A computer program product for use in conjunction with a computer system, the computer program product comprising a computer readable storage medium and a computer program mechanism embedded therein, the computer program mechanism comprising:

a call processing module, the call processing module including instructions for execution by the processor for:
receiving a first call from a caller who uses a particular public address to indicate a call destination associated with a particular subscriber; the particular public address selected from the group consisting of a public telephone number associated with the particular subscriber and a public packet-based address associated with the particular subscriber;
accessing a database that stores a public telephone number and a private packet-based address for each subscriber and retrieving from the database a private packet-based address of the particular subscriber on the basis of the particular public telephone number;
providing an introductory message to the caller and prompting the caller to leave a message;
accessing the particular subscriber via a public switched telephone network based on the particular subscriber private telephone number to establish an audio connection;
notifying the particular subscriber of the first call;
when the particular subscriber answers the first call, providing a one-way communication path between the caller and the particular subscriber via the public switched telephone network so that the particular subscriber may hear the caller leave the message but the caller does not hear or know that the particular subscriber is listening;
connecting the caller and the particular subscriber for two-way communication upon authorization by the particular subscriber;
when the particular subscriber cannot be accessed via the public switched telephone network:
retrieving from the database the private packet-based address of the particular subscriber on the basis of the particular public address;
placing a second call to the particular subscriber using the retrieved private packet-based address via the packet-based network; and
when the particular subscriber answers the second call, providing a one-way communication path between the caller and the particular subscriber so that the particular subscriber may hear the caller leave the message but the caller does not hear or know that the particular subscriber is listening.

26. The computer program product of claim 25, wherein the memory includes a subscriber account configuration module having instructions for enabling the subscriber to designate at least one subscriber configuration value selected from the group consisting of (A) privacy hours during which the ESP will not connect callers to the subscriber, (B) a voice mail address to record calls, (C) a call forwarding packet-based address, (D) a call forwarding telephone number, (E) at least one telephone number to block, (F) at least one packet-based address to block, and (G) business hours during which the ESP will connect callers to the subscriber.

27. The computer program product of claim 25, wherein the public packet-based address is selected from the set consisting of a URL, an email address, a voice-mail address, and an H.323 address.

28. The computer program product of claim 25, wherein the private packet based address is selected from the set consisting of a URL, an email address, a voice-mail address, and an H.323 address.

29. A call screening method for allowing a subscriber to screen calls made to the subscriber, comprising:

receiving a first call at an enhanced service platform unit from a caller who uses a particular public address to indicate a call destination associated with a particular subscriber; the particular public address selected from the group consisting of a public telephone number associated with the particular subscriber and a public packet-based address associated with the particular subscriber;

accessing a database storing a public address and a private packet-based address for each subscriber to retrieve a private packet-based address of the particular subscriber on the basis of the particular public address;

providing an introductory message to the caller in communication with the enhanced service platform unit that prompts the caller to leave a message;

recording the caller's message;

accessing the particular subscriber via a packet-based network, based on the retrieved private packet-based address to establish an audio connection via the packet-based network;

notifying the particular subscriber of the first call via the packet-based network;

when the particular subscriber answers the first call, providing a one-way communication path between the caller and the particular subscriber via the packet-based network;

playing the caller's recorded message so that the particular subscriber may hear the caller's recorded message but the caller does not hear or know that the particular subscriber is listening to the recorded message; and connecting the caller and the particular subscriber for two-way communication upon authorization by the particular subscriber.

30. The method of claim 29, wherein the database stores the public address, the private packet-based address and a private telephone number for each subscriber; and when the particular subscriber cannot be accessed via the packet-based network, the method further comprises:

retrieving the private telephone number of the particular subscriber on the basis of the particular public address;

placing a second call to the particular subscriber using the retrieved private telephone number via a public switched telephone network; and when the particular subscriber answers the second call, providing a one-way communication path between the caller and the particular subscriber via a public switched telephone network, playing the caller's recorded message so that the particular subscriber may hear the caller's recorded message but the caller does not hear or know that the particular subscriber is listening to the recorded message, and connecting the caller and the particular subscriber for two-way communication upon authorization by the particular subscriber.

31. The method of claim 29, further comprising designating, by the subscriber, at least one subscriber configuration value selected from the group consisting of (A) privacy hours during which the ESP will not connect callers to the subscriber, (B) a voice mail address to record calls, (C) a call forwarding packet-based address, (D) a call forwarding telephone number, (E) at least one telephone number to block, (F) at least one packet-based address to block, and (G) business hours during which the ESP will connect callers to the subscriber.

32. The method of claim 29, wherein the private packet based address is selected from the set consisting of a URL, an email address, a voice-mail address, and an H.323 address.

33. The method of claim 29, wherein the public packet-based address is selected from the set consisting of a URL, an email address, a voice-mail address, and an H.323 address.

34. An enhanced services platform for allowing a subscriber to screen calls, comprising:

a processor;

a first interface coupled to a public switched telephone network;

a second interface coupled to a packet-based network;

a memory having a database storing a public address and a private packet-based address for each subscriber;

at least one bus connecting the processor, the memory, the first interface and the second interface;

the memory storing a call processing module, the call processing module including instructions for execution by the processor for:

receiving a first call via the first or second interface from a caller who uses a particular public address to indicate a call destination associated with a particular subscriber; the particular public address selected from the group consisting of a public telephone number associated with the particular subscriber and a public packet-based address associated with the particular subscriber;

accessing a database storing a public address and a private packet-based address for each subscriber to retrieve a private packet-based address of the particular subscriber on the basis of the particular public address;

providing an introductory message to the caller in communication with the enhanced service platform unit that prompts the caller to leave a message;

recording the caller's message;

accessing the particular subscriber based on the retrieved private packet-based address to establish an audio connection via the packet-based network;

notifying the particular subscriber of the first call via the packet-based network;

when the particular subscriber answers the first call, providing a one-way communication path between the caller and the particular subscriber via the packet-based network;

playing the caller's recorded message so that the particular subscriber may hear the caller's recorded message but the caller does not hear or know that the particular subscriber is listening to the recorded message; and connecting the caller and the particular subscriber for two-way communication upon authorization by the particular subscriber.

35. The enhanced service platform of claim 34, wherein the database stores the public address, the private packet-based address and a private telephone number for each subscriber;

the call processing module includes additional instructions, activated when the particular subscriber cannot be accessed via the packet-based network, the additional instructions for:
  retrieving the private telephone number of the particular subscriber on the basis of the particular public address;
  placing a second call to the particular subscriber using the retrieved private telephone number via a public switched telephone network; and
  when the particular subscriber answers the second call, providing a one-way communication path between the caller and the particular subscriber via a public switched telephone network, playing the caller's recorded message so that the particular subscriber may hear the caller's recorded message but the caller does not hear or know that the particular subscriber is listening to the recorded message, and connecting the caller and the particular subscriber for two-way communication upon authorization by the particular subscriber.

36. The enhanced services platform of claim 34, wherein the memory includes a subscriber account configuration module having instruction for enabling the subscriber to designate at least one subscriber configuration value selected from the group consisting of (A) privacy hours during which the ESP will not connect callers to the subscriber, (B) a voice mail address to record calls, (C) a call forwarding packet-based address, (D) a call forwarding telephone number, (E) at least one telephone number to block, (F) at least one packet-based address to block, and (G) business hours during which the ESP will connect callers to the subscriber.

37. The enhanced services platform of claim 34, wherein the private packet-based address is selected from the set consisting of a URL, an email address, a voice-mail address, and an H.323 address.

38. The enhanced services platform of claim 34, wherein the public packet-based address is selected from the set consisting of a URL, an email address, a voice-mail address, and an H.323 address.

39. A computer program product for use in conjunction with a computer system, the computer program product comprising a computer readable storage medium and a computer program mechanism embedded therein, the computer program mechanism comprising:
  a call processing module, the call processing module including instructions for execution by the processor for:
    receiving a first call at an enhanced service platform unit from a caller who uses a particular public address to indicate a call destination associated with a particular subscriber; the particular public address selected from the group consisting of a public telephone number associated with the particular subscriber and a public packet-based address associated with the particular subscriber;
    accessing a database storing a public address and a private packet-based address for each subscriber to retrieve a private packet-based address of the particular subscriber on the basis of the particular public address;
    providing an introductory message to the caller in communication with the enhanced service platform unit that prompts the caller to leave a message;
    recording the caller's message;
    accessing the particular subscriber via the packet-based network, based on the retrieved private packet-based address to establish an audio connection via the packet-based network;
    notifying the particular subscriber of the first call via the packet-based network;
    when the particular subscriber answers the first call, providing a one-way communication path between the caller and the particular subscriber via the packet-based network;
    playing the caller's recorded message so that the particular subscriber may hear the caller's recorded message but the caller does not hear or know that the particular subscriber is listening to the recorded message; and
    connecting the caller and the particular subscriber for two-way communication upon authorization by the particular subscriber.

40. The computer program product of claim 39, wherein the database accessed by the accessing step stores the public address, the private packet-based address and a private telephone number for each subscriber;
the call processing module includes additional instructions, activated when the particular subscriber cannot be accessed via the packet-based network, the method further comprises:
  retrieving the private telephone number of the particular subscriber on the basis of the particular public address;
  placing a second call to the particular subscriber using the retrieved private telephone number via a public switched telephone network; and
  when the particular subscriber answers the second call, providing a one-way communication path between the caller and the particular subscriber via a public switched telephone network, playing the caller's recorded message so that the particular subscriber may hear the caller's recorded message but the caller does not hear or know that the particular subscriber is listening to the recorded message, and connecting the caller and the particular subscriber for two-way communication upon authorization by the particular subscriber.

41. The computer program product of claim 39, wherein the memory includes a subscriber account configuration module having instructions for enabling the subscriber to designate at least one subscriber configuration value selected from the group consisting of (A) privacy hours during which the ESP will not connect callers to the subscriber, (B) a voice mail address to record calls, (C) a call forwarding packet-based address, (D) a call forwarding telephone number, (E) at least one telephone number to block, (F) at least one packet-based address to block, and (G) business hours during which the ESP will connect callers to the subscriber.

42. The computer program product of claim 39, wherein the private packet based address is selected from the set consisting of a URL, an email address, a voice-mail address, and an H.323 address.

43. The computer program product of claim 39, wherein the public packet-based address is selected from the set consisting of a URL, an email address, a voice-mail address, and an H.323 address.

44. A packet-based communication method for anonymously enabling a subscriber to communicate with an accesser, the method allowing the accesser to communicate with the subscriber without the accesser knowing the identity of the subscriber prior to establishing communication with the subscriber, but knowing a particular subscriber with whom communication is desired, and allowing the identity of the particular subscriber and the accesser to be kept anonymous during communication between the particular subscriber and the accesser unless voluntarily revealed by either the particular subscriber or the accesser, the method comprising:

receiving a published public address from the accesser, the accesser having an accesser packet-based address;

accessing a database storing a public address and a private packet-based address for each subscriber to retrieve a private packet-based address of a particular subscriber on the basis of the received public address; and connecting the accesser to the particular subscriber using the private subscriber packet-based address without informing the accesser of the private subscriber packet-based address of the particular subscriber, and without informing the particular subscriber of the accesser packet-based address.

45. The method of claim 35 wherein the database stores the public address, the private packet-based address and a private telephone number for each subscriber;

when the particular subscriber cannot be accessed via the packet-based network, the method further comprises:

retrieving the private telephone number of the particular subscriber on the basis of the particular public address;

placing a second call to the particular subscriber using the retrieved private telephone number via the public switched telephone network; and when the particular subscriber answers the second call, connecting the accesser and the particular subscriber without informing the accesser of the packet-based address and the private telephone number of the particular subscriber, and without informing the particular subscriber of the accesser packet-based address.

46. The method of claim 44, wherein:

the database stores a plurality of private packet-based addresses for a subset of the subscribers; and the method includes selecting one of the plurality of private packet-based addresses for the particular subscriber in accordance with predefined selection criteria, and connecting the accesser to the particular subscriber using the selected private subscriber packet-based address.

47. The method of claim 44, further including:

recording a message from the accesser if the particular subscriber is unavailable to receive a call.

48. The method of claim 44, further comprising designating, by the subscriber, at least one subscriber configuration value selected from the group consisting of (A) privacy hours during which the ESP will not connect callers to the subscriber, (B) a voice mail address to record calls, (C) a call forwarding packet-based address, (D) a call forwarding telephone number, (E) at least one telephone number to block, (F) at least one packet-based address to block, and (G) business hours during which the ESP will connect callers to the subscriber.

49. The method of claim 44, wherein the private packet based address is selected from the set consisting of a URL, an email address, a voice-mail address, and an H.323 address.

50. The method of claim 44, wherein the public packet-based address is selected from the set consisting of a URL, an email address, a voice-mail address, and an H.323 address.

51. An enhanced services platform for allowing a subscriber to anonymously communicate with an accesser, the accesser communicates with the subscriber without the accesser knowing the identity of the subscriber prior to establishing communication with the subscriber, but knowing a particular subscriber with whom communication is desired, and allows the identity of the particular subscriber and the accesser to be kept anonymous during communication between the particular subscriber and the accesser unless voluntarily revealed by either the particular subscriber or the accesser, comprising:

a processor;

a first interface coupled to a packet-based network;

a second interface coupled to a packet-based network;

a memory having a database storing a public address and a private packet-based address for each subscriber;

at least one bus connecting the processor, the memory, the first interface and the second interface;

the memory storing a call processing module, the call processing module including instructions for execution by the processor for:

receiving a published public address from the accesser, the accesser having an accesser packet-based address;

accessing the database to retrieve a private packet-based address of a particular subscriber on the basis of the received public address; and connecting the accesser to the particular subscriber using the private subscriber packet-based address without informing the accesser of the private subscriber packet-based address of the particular subscriber, and without informing the particular subscriber of the accesser packet-based address.

52. The enhanced services platform of claim 51 wherein the database stores the public address, the private packet-based address and a private telephone number for each subscriber;

the call processing module includes additional instructions, activated when the particular subscriber cannot be accessed via the packet-based network, the additional instructions for:

retrieving the private telephone number of the particular subscriber on the basis of the particular public address;

placing a second call to the particular subscriber using the retrieved private telephone number via the public switched telephone network; and when the particular subscriber answers the second call, providing a connection between the accesser and the particular subscriber without informing the accesser of the packet-based address and the private telephone number of the particular subscriber, and without informing the particular subscriber of the accesser packet-based address.

53. The enhanced services platform of claim 51, wherein the database stores a plurality of private packet-based addresses for a subset of the subscribers; and the call processing module includes additional instructions for:

selecting one of the plurality of private packet-based addresses for the particular subscriber in accordance with predefined selection criteria, and connecting the accesser to the particular subscriber using the selected private subscriber packet-based address.

54. The enhanced services platform of claim 51, wherein the call processing module includes additional instructions for:

recording a message from the accesser if the particular subscriber is unavailable to receive a call.

55. The enhanced services platform of claim 51, further comprising designating, by the subscriber, at least one subscriber configuration value selected from the group consisting of (A) privacy hours during which the ESP will not connect callers to the subscriber, (B) a voice mail address to record calls, (C) a call forwarding packet-based address, (D) a call forwarding telephone number, (E) at least one telephone number to block, (F) at least one packet-based address to block, and (G) business hours during which the ESP will connect callers to the subscriber.

56. The enhanced services platform of claim 51, wherein the private packet based address is selected from the set consisting of a URL, an email address, a voice-mail address, and an H.323 address.

57. The enhanced services platform of claim 51, wherein the public packet-based address is selected from the set consisting of a URL, an email address, a voice-mail address, and an H.323 address.

58. A computer program product for use in conjunction with a computer system, the computer program product comprising a computer readable storage medium and a computer program mechanism embedded therein, the computer program mechanism comprising:
   a call processing module, the call processing module including instructions for execution by the processor for:
      receiving a published public address from the accesser, the accesser having an accesser packet-based address;
      accessing a database storing a public address and a private packet-based address for each subscriber to retrieve a private packet-based address of a particular subscriber on the basis of the received public address; and
      connecting the accesser to the particular subscriber using the private subscriber packet-based address without informing the accesser of the private subscriber packet-based address of the particular subscriber, and without informing the particular subscriber of the accesser packet-based address.

59. The computer program product of claim 58, wherein the database accessed by the accessing instructions stores the public address, the private packet-based address and a private telephone number for each subscriber;
   the call processing module includes additional instructions, activated when the particular subscriber cannot be accessed via the packet-based network, the additional instructions for:
      retrieving the private telephone number of the particular subscriber on the basis of the particular public address;
      placing a second call to the particular subscriber using the retrieved private telephone number via the public switched telephone network; and
      when the particular subscriber answers the second call, providing a connection between the accesser and the particular subscriber without informing the accesser of the packet-based address and the private telephone number of the particular subscriber, and without informing the particular subscriber of the accesser packet-based address.

60. The computer program product of claim 58 wherein the database stores a plurality of private packet-based addresses for a subset of the subscribers; and the call processing module includes additional instructions for:
   selecting one of the plurality of private packet-based addresses for the particular subscriber in accordance with predefined selection criteria, and connecting the accesser to the particular subscriber using the selected private subscriber packet-based address.

61. The computer program product of claim 58, wherein the call processing module includes additional instructions for:
   recording a message from the accesser if the particular subscriber is unavailable to receive a call.

62. The method of claim 58, further comprising designating, by the subscriber, at least one subscriber configuration value selected from the group consisting of (A) privacy hours during which the ESP will not connect callers to the subscriber, (B) a voice mail address to record calls, (C) a call forwarding packet-based address, (D) a call forwarding telephone number, (E) at least one telephone number to block, (F) at least one packet-based address to block, and (G) business hours during which the ESP will connect callers to the subscriber.

63. The method of claim 58, wherein the private packet based address is selected from the set consisting of a URL, an email address, a voice-mail address, and an H.323 address.

64. The method of claim 58, wherein the public packet-based address is selected from the set consisting of a URL, an email address, a voice-mail address, and an H.323 address.

* * * * *